US012809308B2

(12) United States Patent
Sato

(10) Patent No.: US 12,809,308 B2
(45) Date of Patent: Nov. 24, 2026

(54) IMAGE FORMING APPARATUS HAVING DRUM FRAME WITH PASSAGE OPENING, DEVELOPING HOUSING WITH RECEPTION OPENING, AND SEAL

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/226,917

(22) Filed: Jun. 3, 2025

(65) Prior Publication Data

US 2025/0291310 A1 Sep. 18, 2025

Related U.S. Application Data

(63) Continuation of application No. 18/532,115, filed on Dec. 7, 2023, now Pat. No. 12,353,163.

(30) Foreign Application Priority Data

Jan. 13, 2023 (JP) ................................ 2023-003969

(51) Int. Cl.
*G03G 21/00* (2006.01)
*G03G 15/08* (2006.01)
*G03G 21/18* (2006.01)

(52) U.S. Cl.
CPC ..... *G03G 21/1821* (2013.01); *G03G 15/0886* (2013.01); *G03G 2215/0692* (2013.01)

(58) Field of Classification Search
CPC ........... G03G 15/0886; G03G 15/0881; G03G 15/0875; G03G 15/087; G03G 21/1817;
(Continued)

(56) References Cited

U.S. PATENT DOCUMENTS

2006/0177241 A1* 8/2006 Sato .................. G03G 15/0862
399/254
2008/0205940 A1 8/2008 Mase et al.
(Continued)

FOREIGN PATENT DOCUMENTS

JP 2003-029515 A 1/2003
JP 2008-209758 A 9/2008
(Continued)

*Primary Examiner* — Robert B Beatty
(74) *Attorney, Agent, or Firm* — Merchant & Gould P.C.

(57) ABSTRACT

A drum frame includes a first frame, a second frame, and a partition portion. The first frame supports one end of a photosensitive drum in a first direction. The second frame supports another end of the photosensitive drum in the first direction. The partition portion is not movable relative to the photosensitive drum. The partition portion has a passage opening through which toner from a toner cartridge passes. A development housing has a reception opening configured to receive toner that has passed through the passage opening. The reception opening is larger than the passage opening. The development housing is movable relative to the photosensitive drum. A seal is located around the passage opening and the reception opening. The seal seals between the partition portion and the development housing. A conveyor is located in the development housing. The conveyor faces the partition portion via the reception opening.

11 Claims, 18 Drawing Sheets

(58) Field of Classification Search
CPC ......... G03G 21/1821; G03G 2215/067; G03G 2215/068; G03G 2215/0663; G03G 2215/0692; G03G 2221/1861
USPC .................................................. 399/111, 113
See application file for complete search history.

(56) References Cited

U.S. PATENT DOCUMENTS

| | | | | |
|---|---|---|---|---|
| 2008/0239868 | A1* | 10/2008 | Takagi | B01F 27/70 366/305 |
| 2008/0267658 | A1 | 10/2008 | Takaki et al. | |
| 2009/0016767 | A1 | 1/2009 | Koido | |
| 2009/0245855 | A1* | 10/2009 | Sakuma | G03G 15/0898 399/106 |
| 2010/0202803 | A1* | 8/2010 | Sato | G03G 15/0896 399/263 |
| 2011/0069995 | A1* | 3/2011 | Sato | G03G 15/6555 399/258 |
| 2011/0182613 | A1* | 7/2011 | Kamimura | G03G 15/0896 399/110 |
| 2012/0039633 | A1* | 2/2012 | Itabashi | G03G 15/0813 399/258 |
| 2017/0108800 | A1* | 4/2017 | Sato | G03G 15/0886 |
| 2022/0276604 | A1 | 9/2022 | Sato et al. | |
| 2025/0036075 | A1* | 1/2025 | Sato | G03G 21/1842 |
| 2025/0053117 | A1* | 2/2025 | Sato | G03G 15/0806 |
| 2025/0068097 | A1* | 2/2025 | Sato | G03G 15/0817 |

FOREIGN PATENT DOCUMENTS

| | | | |
|---|---|---|---|
| JP | 2008-209865 | A | 9/2008 |
| JP | 2008-275875 | A | 11/2008 |
| JP | 2022-133180 | A | 9/2022 |

* cited by examiner

IMAGE FORMING APPARATUS HAVING DRUM FRAME WITH PASSAGE OPENING, DEVELOPING HOUSING WITH RECEPTION OPENING, AND SEAL

REFERENCE TO RELATED APPLICATIONS

This application is a continuation of U.S. patent application Ser. No. 18/532,115 filed on Dec. 7, 2023, which claims priority from Japanese Patent Application No. 2023-003969 filed on Jan. 13, 2023. The entire content of each of the priority applications is incorporated herein by reference.

BACKGROUND ART

As a process cartridge of an image forming apparatus, a process cartridge to which a toner cartridge is detachably attachable is known.

SUMMARY

A process cartridge includes a photosensitive drum, a drum frame, a development housing, and a development roller. The photosensitive drum is rotatably supported by the drum frame. The development housing is supported by the drum frame. The development roller is supported by the development housing, and supplies toner in the development housing to the photosensitive drum. The development housing includes a support portion that supports a toner cartridge. The development housing has a reception opening. In a state where the toner cartridge is supported by the support portion, the toner from the toner cartridge passes through the reception opening.

In the process cartridge, in order to keep a pressing force of the development roller against the photosensitive drum constant, the development housing supporting the development roller may be configured to be movable relative to the photosensitive drum.

However, in the process cartridge, since the development housing supports the toner cartridge, there is a possibility that the development housing may not easily move relative to the photosensitive drum due to the weight of the toner cartridge.

Thus, it is considered to configure only the development housing to be movable relative to the photosensitive drum without moving the toner cartridge relative to the photosensitive drum.

In that case, it is necessary to stably supply toner from the toner cartridge which does not move relative to the photosensitive drum to the development housing which is movable relative to the photosensitive drum, while suppressing toner leakage.

In view of the foregoing, an example of an object of this disclosure is to provide a process cartridge configured to stably supply toner from a toner cartridge which does not move relative to a photosensitive drum to a development housing which is movable relative to the photosensitive drum, while suppressing toner leakage.

According to one aspect, this specification discloses an image forming apparatus to which a toner cartridge is detachably attachable. The image forming apparatus includes a photosensitive drum, a drum frame, a development roller, a development housing, a seal, and a conveyor. The photosensitive drum is rotatable about a drum axis extending in a first direction. The drum frame includes a first frame, a second frame, and a partition portion. The first frame supports one end of the photosensitive drum in the first direction. The second frame supports another end of the photosensitive drum in the first direction. The partition portion is not movable relative to the photosensitive drum. The partition portion has a passage opening through which toner from the toner cartridge passes. The development housing has a reception opening configured to receive toner that has passed through the passage opening. The reception opening is larger than the passage opening. The development housing supports the development roller. The development housing is movable relative to the photosensitive drum. The seal is located around the passage opening and the reception opening. The seal seals between the partition portion and the development housing. The conveyor is located in the development housing. The conveyor is configured to convey toner. The conveyor faces the partition portion via the reception opening.

DESCRIPTION

1. Outline of Process Cartridge 1

Figure 1:
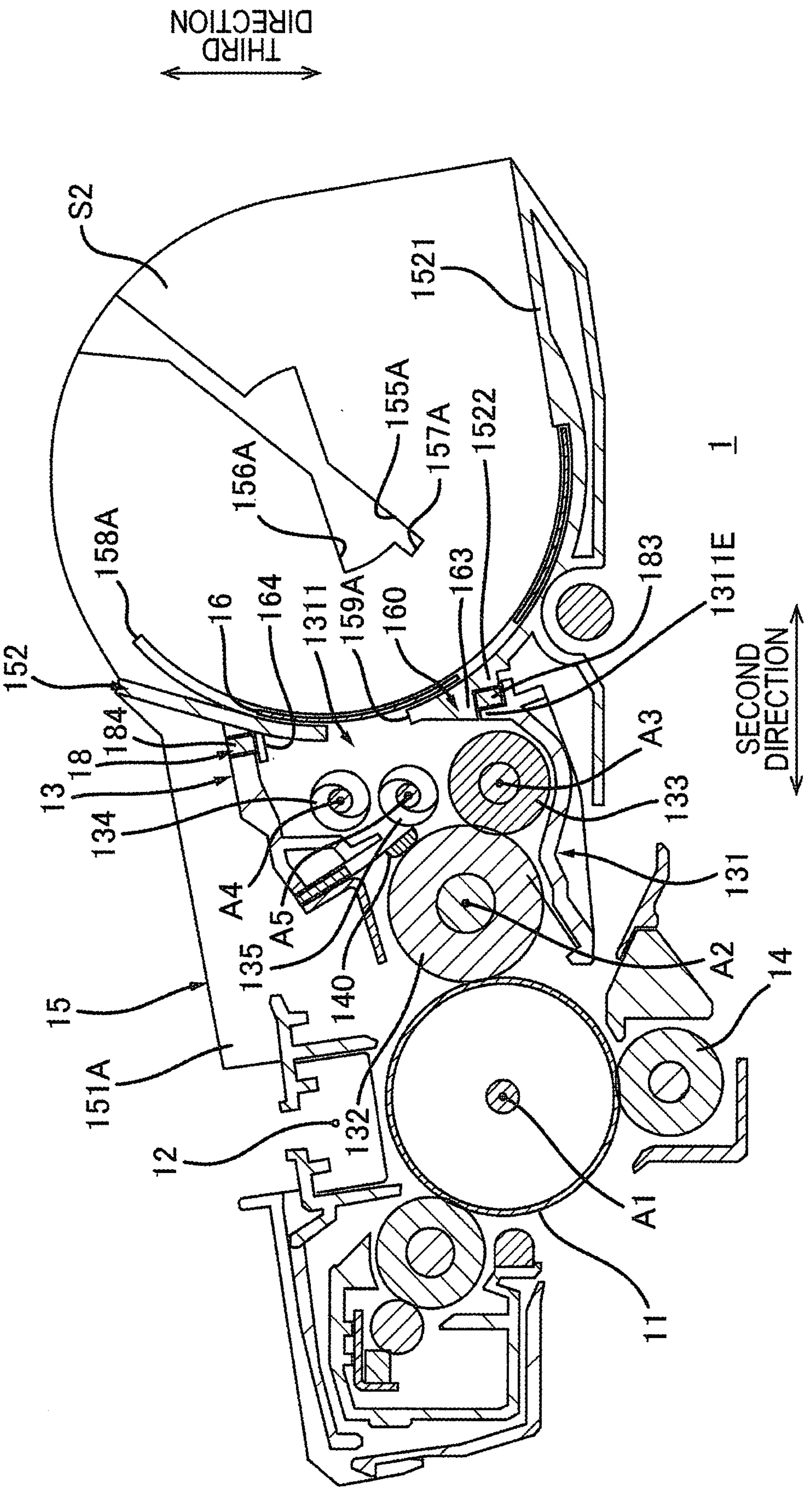
FIG. 1 is a central cross-sectional view of a process cartridge, taken along a line I-I in FIG. 2.

As shown in FIG. 1, a process cartridge 1 includes a photosensitive drum 11, a charger 12, a development unit 13, and a transfer roller 14. A toner cartridge 2 is attachable to and detachable from the process cartridge 1. The process cartridge 1 is attachable to and detachable from an image forming apparatus 100. The toner cartridge 2 and the image forming apparatus 100 will be described later.

1.1 Photosensitive Drum 11

The photosensitive drum 11 is rotatable about a drum axis A1. The drum axis A1 extends in a first direction (see FIG. 2). The photosensitive drum 11 extends in the first direction. The photosensitive drum 11 has a cylindrical shape.

1.2 Charger 12

The charger 12 charges a circumferential surface of the photosensitive drum 11. In the present embodiment, the charger 12 is a scorotron charger.

1.3 Development Unit 13

The development unit 13 is configured to supply toner to the photosensitive drum 11. The development unit 13 includes a development housing 131, a development roller 132, a supply roller 133, and a layer thickness regulating blade 140. In other words, the process cartridge 1 includes the development housing 131, the development roller 132, the supply roller 133, and the layer thickness regulating blade 140.

The development housing 131 is configured to contain toner. The development housing 131 supports the development roller 132, the supply roller 133, and the layer thickness regulating blade 140. The development roller 132 is supported at one end of the development housing 131 in a second direction. The second direction crosses the first direction. For example, the second direction is perpendicular to the first direction. In a state where the process cartridge 1 is attached to the image forming apparatus 100 and the image forming apparatus 100 is placed on a horizontal plane, the second direction is a horizontal direction.

The development roller 132 is configured to supply the toner in the development housing 131 to the photosensitive drum 11. The development roller 132 is in contact with the photosensitive drum 11. The development roller 132 may be separable from the photosensitive drum 11. The development roller 132 is rotatable about a development axis A2. The development axis A2 extends in the first direction. The development roller 132 extends in the first direction. The development roller 132 has a columnar shape.

The supply roller 133 is configured to supply the toner to the development roller 132 in the development housing 131. The supply roller 133 is located on the opposite side of the photosensitive drum 11 with respect to the development roller 132 in the second direction. The supply roller 133 is in contact with the development roller 132. The supply roller 133 is rotatable about a supply roller axis A3. The supply roller axis A3 extends in the first direction. The supply roller 133 extends in the first direction. The supply roller 133 has a columnar shape.

The layer thickness regulating blade 140 regulates the thickness of the toner on the development roller 132. The layer thickness regulating blade 140 is in contact with the development roller 132.

1.4 Transfer Roller 14

The transfer roller 14 is in contact with the circumferential surface of the photosensitive drum 11. The transfer roller 14 transfers the toner from the circumferential surface of the photosensitive drum 11 to a sheet S. The sheet S will be described later.

2. Details of Process Cartridge 1

The process cartridge 1 will be described in detail with reference to FIGS. 1 to 9.

As shown in FIG. 1, the process cartridge 1 includes a drum frame 15, a shutter 16, and a seal (sealing member) 18 in addition to the photosensitive drum 11, the charger 12, the development unit 13, and the transfer roller 14 described above.

2.1 Drum Frame 15

Figure 2:
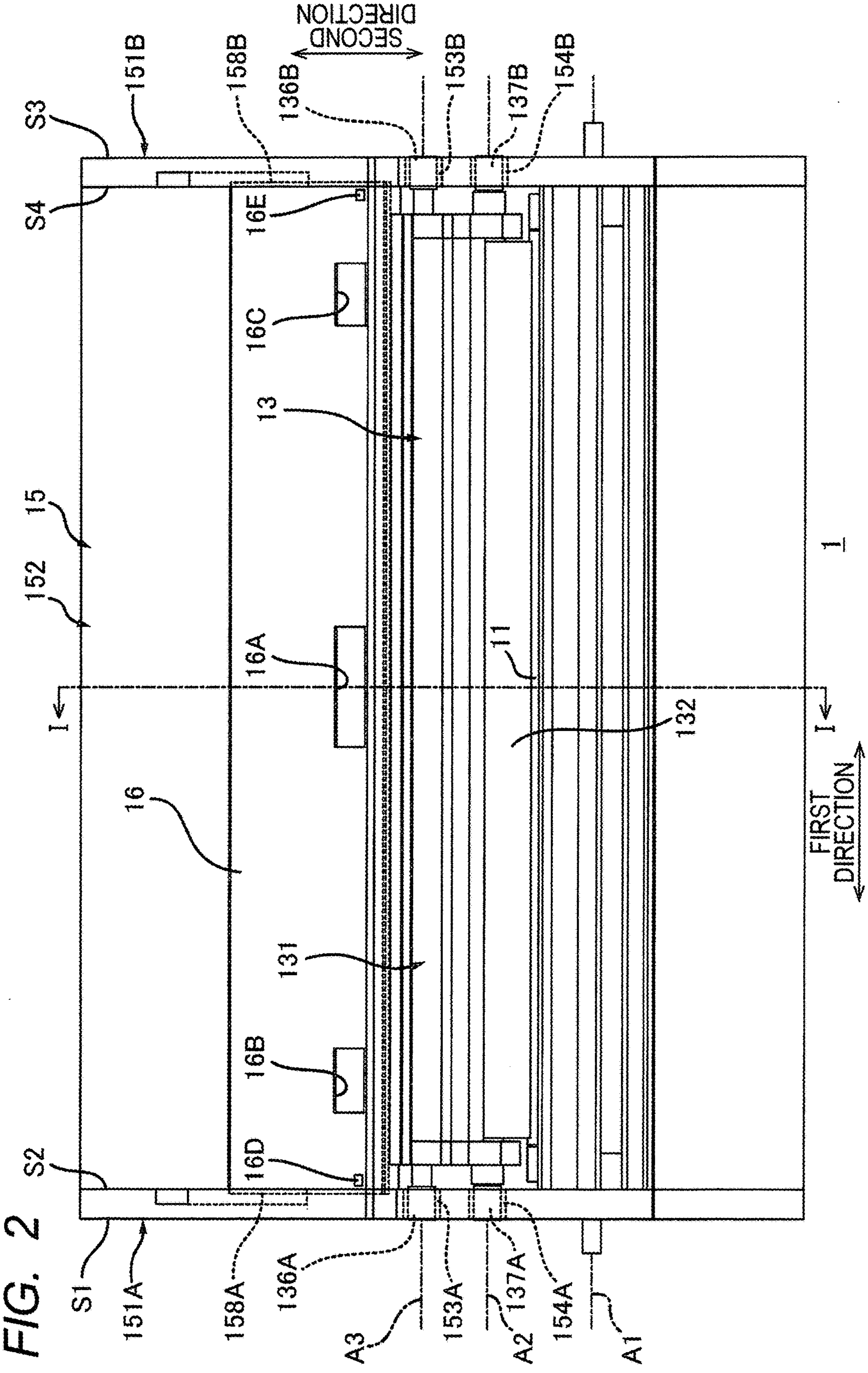
FIG. 2 is a plan view of the process cartridge shown in FIG. 1.

The drum frame 15 supports the photosensitive drum 11, the charger 12, the development unit 13, and the transfer roller 14. As shown in FIG. 2, the drum frame 15 includes a first frame 151A, a second frame 151B, and a support frame 152.

2.1.1 First Frame 151A

Figure 3:
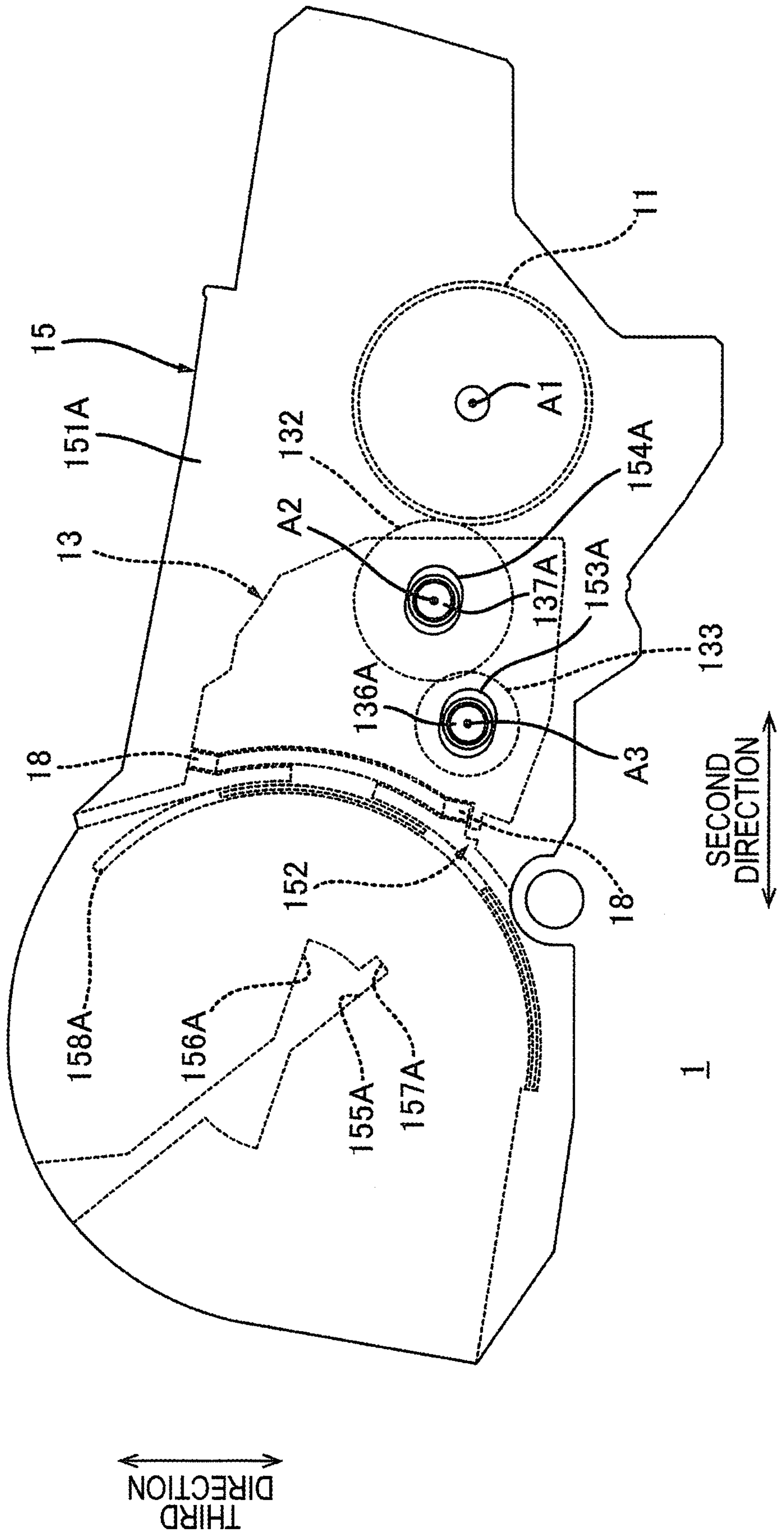
FIG. 3 is a side view of the process cartridge as viewed from one side in a first direction.

The first frame 151A is located at one end of the drum frame 15 in the first direction. The first frame 151A supports one end of the photosensitive drum 11 in the first direction. The first frame 151A extends in a direction crossing the first direction. For example, the first frame 151A extends in a direction perpendicular to the first direction. The first frame 151A has an outer surface S1 and an inner surface S2. As shown in FIG. 3, the first frame 151A has two through holes 153A and 154A, a guide portion 155A, a lock portion 156A, a stopper 157A, and a guide portion 158A.

The through hole 153A is located away from the photosensitive drum 11 in a direction connecting the drum axis A1 and the development axis A2. The through hole 153A is an elongated hole. The through hole 153A extends in the direction connecting the drum axis A1 and the development axis A2.

The through hole 154A is located between the photosensitive drum 11 and the through hole 153A in the direction connecting the drum axis A1 and the development axis A2. The through hole 154A is an elongated hole. The through hole 154A extends in the direction connecting the drum axis A1 and the development axis A2.

As shown in FIG. 1, the guide portion 155A is located on the inner surface S2 of the first frame 151A. In the present embodiment, the guide portion 155A is a groove. In the present embodiment, the guide portion 155A extends in a direction crossing both the first direction (see FIG. 2) and the second direction.

The lock portion 156A is located at one end of the guide portion 155A in the direction in which the guide portion 155A extends. In the present embodiment, the lock portion 156A is a groove. The lock portion 156A extends in a direction crossing the guide portion 155A.

The stopper 157A is located at the inner surface S2 of the first frame 151A. The stopper 157A is located between the guide portion 155A and the support frame 152 in the direction in which the guide portion 155A extends. The stopper 157A is connected to the guide portion 155A. In the present embodiment, the stopper 157A is a groove. In a state where the toner cartridge 2 (see FIG. 10) is supported by the support frame 152, a protrusion 33A of the toner cartridge 2 fits into the stopper 157A. The protrusion 33A will be described later.

The guide portion 158A is located on the inner surface S2 of the first frame 151A. The guide portion 158A is located on the opposite side of the development unit 13 with respect to the support frame 152. The guide portion 158A has an arc shape along a circumferential surface S5 of the toner cartridge 2 (see FIG. 10). The circumferential surface S5 will be described later. In the present embodiment, the guide portion 158A is a groove. As shown in FIG. 2, the guide portion 158A guides one end of the shutter 16 in the first direction. The guide portion 158A extends in a movement direction of the shutter 16.

2.1.2 Second Frame 151B

Figure 4:
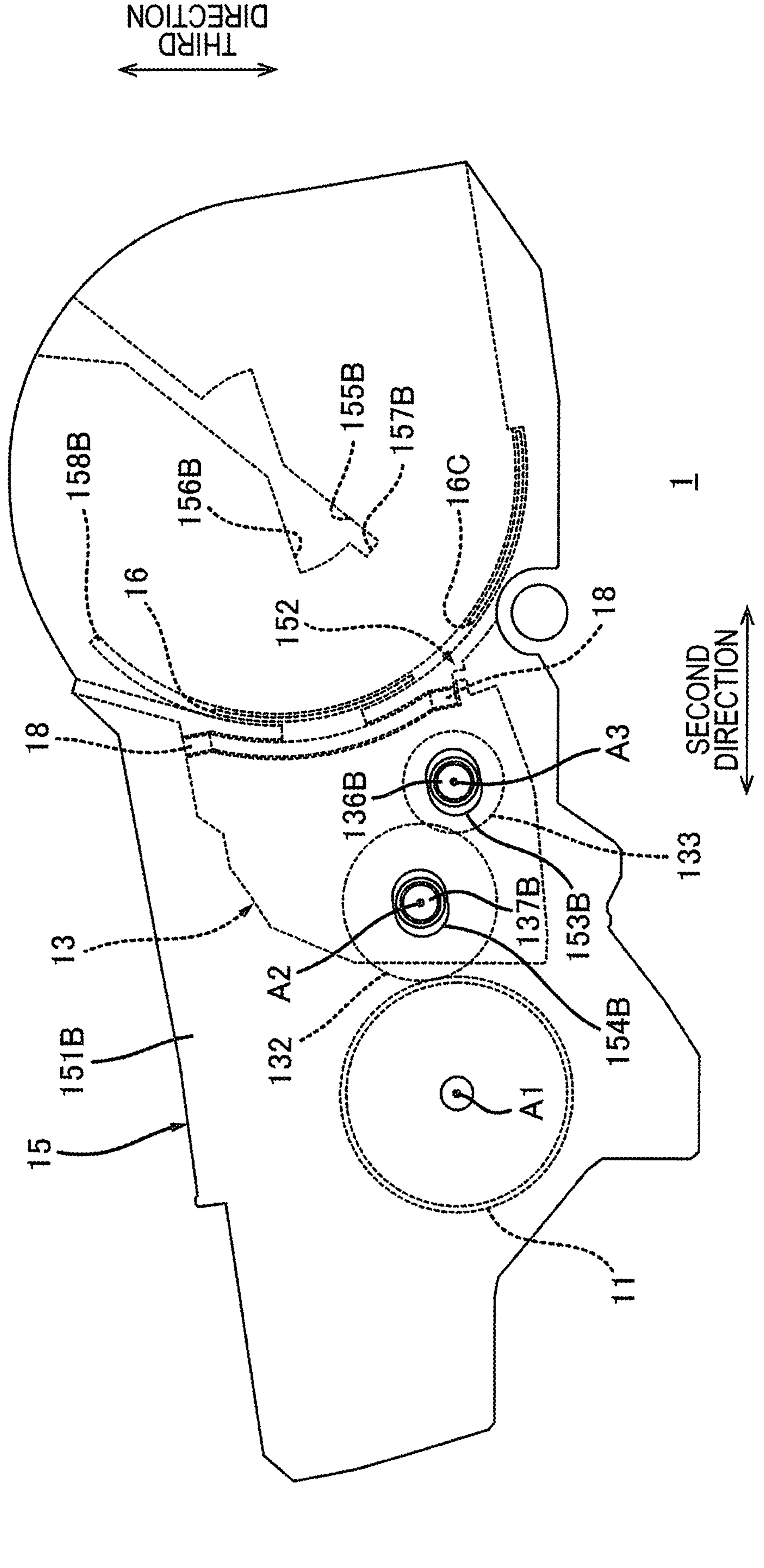
FIG. 4 is a side view of the process cartridge as viewed from the other side in the first direction.

The second frame 151B is located at the other end of the drum frame 15 in the first direction. The second frame 151B is located away from the first frame 151A in the first direction. The second frame 151B supports the other end of the photosensitive drum 11 in the first direction. The first frame 151A supports one end of the photosensitive drum 11 in the first direction, and the second frame 151B supports the other end of the photosensitive drum 11 in the first direction, whereby the drum frame 15 supports the photosensitive drum 11. The second frame 151B extends in a direction crossing the first direction. For example, the second frame 151B extends in a direction perpendicular to the first direction. The second frame 151B has an outer surface S3 and an inner surface S4. As shown in FIG. 4, the second frame 151B has two through holes 153B and 154B, a guide portion 155B, a lock portion 156B, a stopper 157B, and a guide portion 158B.

The through hole 153B is located away from the photosensitive drum 11 in the direction connecting the drum axis A1 and the development axis A2. The through hole 153B is an elongated hole, similarly to the through hole 153A (see FIG. 3). The through hole 153B extends in the direction connecting the drum axis A1 and the development axis A2.

The through hole 154B is located between the photosensitive drum 11 and the through hole 153B in the direction connecting the drum axis A1 and the development axis A2. The through hole 154B is an elongated hole, similarly to the through hole 154A (see FIG. 3). The through hole 154B extends in the direction connecting the drum axis A1 and the development axis A2.

The guide portion 155B is located on the inner surface S4 (see FIG. 2) of the second frame 151B. In the present embodiment, the guide portion 155B is a groove. In the present embodiment, the guide portion 155B extends in the same direction as the guide portion 155A (see FIG. 1).

The lock portion 156B is located at one end of the guide portion 155B in the direction in which the guide portion 155B extends. In the present embodiment, the lock portion 156B is a groove. The lock portion 156B extends in a direction crossing the guide portion 155B. In the present embodiment, the lock portion 156B extends in the same direction as the lock portion 156A (see FIG. 1).

The stopper 157B is located on the inner surface S4 (see FIG. 2) of the second frame 151B. The stopper 157B is located between the guide portion 155B and the support frame 152 in the direction in which the guide portion 155B extends. The stopper 157B is connected to the guide portion 155B. In the present embodiment, the stopper 157B is a groove. In a state where the toner cartridge 2 (see FIG. 10) is supported by the support frame 152, a protrusion 33B of the toner cartridge 2 fits into the stopper 157B. The protrusion 33B will be described later.

The guide portion 158B is located on the inner surface S4 (FIG. 2) of the second frame 151B. The guide portion 158B is located on the opposite side of the development unit 13 with respect to the support frame 152. The guide portion 158B has an arc shape along the circumferential surface S5 of the toner cartridge 2 (see FIG. 10). In the present embodiment, the guide portion 158B is a groove. The guide portion 158B guides the other end of the shutter 16 in the first direction. The guide portion 158B extends in the same direction as the guide portion 158A (see FIG. 1).

2.1.3 Support Frame 152

Figure 5:
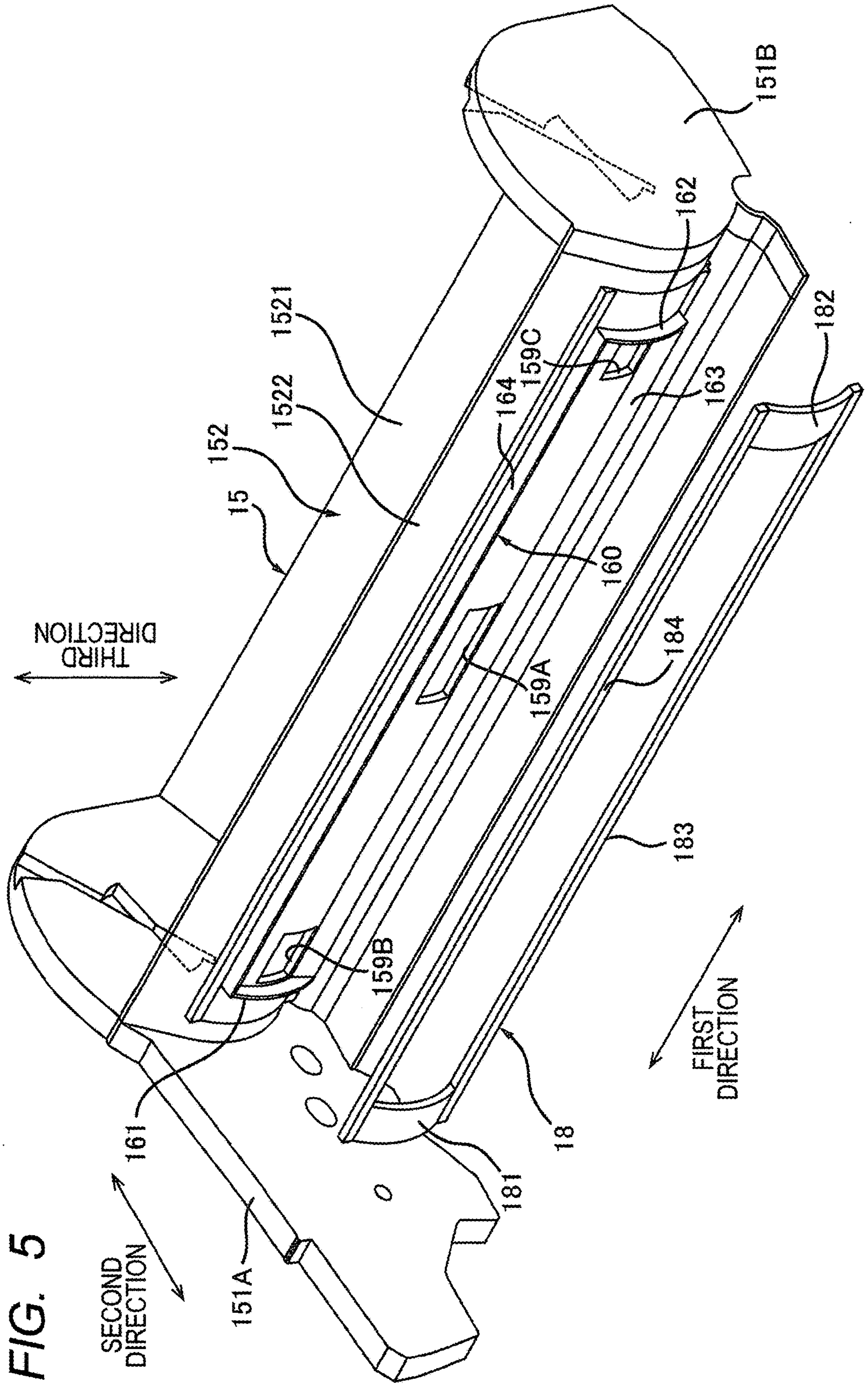
FIG. 5 is a perspective view of a part of a drum frame and a seal shown in FIG. 1.

As shown in FIG. 1, the support frame 152 is located on the opposite side of the photosensitive drum 11 with respect to the development unit 13 in the second direction. The support frame 152 is configured to support the toner cartridge 2 (see FIG. 10). As shown in FIG. 5, the support frame 152 is located between the first frame 151A and the second frame 151B in the first direction. The support frame 152 extends in the first direction. One end of the support frame 152 in the first direction is connected to the first frame 151A. The other end of the support frame 152 in the first direction is connected to the second frame 151B. The support frame 152 does not move relative to the photosensitive drum 11 (see FIG. 1). The support frame 152 includes a support portion 1521 and a partition portion 1522.

2.1.3.1 Support Portion 1521 and Partition Portion 1522

The support portion 1521 extends in the first direction and the second direction. The support portion 1521 is located between the first frame 151A and the second frame 151B in the first direction. One end of the support portion 1521 in the first direction is connected to the first frame 151A. The other end of the support portion 1521 in the first direction is connected to the second frame 151B.

As shown in FIG. 1, the partition portion 1522 is located between the support portion 1521 and the development housing 131 in the second direction. In a state where the toner cartridge 2 (see FIG. 10) is attached to the process cartridge 1, the partition portion 1522 partitions the toner cartridge 2 and the development housing 131. The partition portion 1522 extends in a third direction from the support portion 1521. The third direction crosses both the first direction and the second direction. For example, the third direction is perpendicular to both the first direction and the second direction. For example, the third direction is a vertical direction in a state where the process cartridge 1 is attached to the image forming apparatus 100 and the image forming apparatus 100 is placed on a horizontal plane. As shown in FIG. 5, the partition portion 1522 extends in the first direction. The partition portion 1522 is located between the first frame 151A and the second frame 151B in the first direction. One end of the partition portion 1522 in the first direction is connected to the first frame 151A. The other end of the partition portion 1522 in the first direction is connected to the second frame 151B. The partition portion 1522 includes a passage opening 159A, two second passage openings 159B and 159C, and a rib 160. In other words, the support frame 152 includes the passage opening 159A, the two second passage openings 159B and 159C, and the rib 160.

2.1.3.2 Passage Opening 159A and Second Passage Openings 159B and 159C The passage opening 159A is located at a central portion of the partition portion 1522 in the first direction. As shown in FIG. 1, the passage opening 159A is located between the development housing 131 and the lock portion 156A in the second direction. The passage opening 159A communicates with a reception opening 1311 of the development housing 131. The reception opening 1311 will be described later. In a state where the toner cartridge 2 (see FIG. 10) is supported by the support frame 152, the toner from the toner cartridge 2 passes through the passage opening 159A.

As shown in FIG. 5, the second passage opening 159B is located away from the passage opening 159A in the first direction. The second passage opening 159B is located between the passage opening 159A and the first frame 151A in the first direction. In a state where the toner cartridge 2 (see FIG. 10) is supported by the support frame 152, the toner from the development housing 131 (see FIG. 1) passes through the second passage opening 159B.

The second passage opening 159C is located on the opposite side of the second passage opening 159B with respect to the passage opening 159A in the first direction. The second passage opening 159C is located away from the passage opening 159A in the first direction. The second passage opening 159C is located between the passage opening 159A and the second frame 151B in the first direction. In a state where the toner cartridge 2 (see FIG. 10) is supported by the support frame 152, the toner from the development housing 131 (see FIG. 1) passes through the second passage opening 159C.

2.1.3.3 Rib 160

The rib 160 protrudes from the partition portion 1522 of the support frame 152 toward the development housing 131 (see FIG. 1). The rib 160 surrounds the passage opening 159A and the second passage openings 159B and 159C. The rib 160 is located around the passage opening 159A and the second passage openings 159B and 159C, and is located away from the passage opening 159A. The rib 160 has a frame shape. Specifically, the rib 160 includes a first rib 161, a second rib 162, a third rib 163, and a fourth rib 164.

The first rib 161 is located at one end of the rib 160 in the first direction. The first rib 161 is located between the first frame 151A and the second passage opening 159B in the first direction. The first rib 161 extends in the third direction.

The second rib 162 is located at the other end of the rib 160 in the first direction. The second rib 162 is located between the second passage opening 159C and the second frame 151B in the first direction. The second rib 162 extends in the third direction.

The third rib 163 is located at one end of the rib 160 in the third direction. The third rib 163 is located between the support portion 1521 and the passage opening 159A, the second passage openings 159B, 159C in the third direction. The third rib 163 is located between the first rib 161 and the second rib 162 in the first direction. The third rib 163 extends in the first direction. One end of the third rib 163 in the first direction is connected to one end of the first rib 161 in the third direction. The other end of the third rib 163 in the first direction is connected to one end of the second rib 162 in the third direction.

The fourth rib 164 is located at the other end of the rib 160 in the third direction. The fourth rib 164 is located away from the third rib 163 in the third direction. The fourth rib 164 is located on the opposite side of the third rib 163 with respect to the passage opening 159A and the second passage openings 159B and 159C in the third direction. The fourth rib 164 is located between the first rib 161 and the second rib 162 in the first direction. The fourth rib 164 extends in the first direction. One end of the fourth rib 164 in the first direction is connected to the other end of the first rib 161 in the third direction. The other end of the fourth rib 164 in the first direction is connected to the other end of the second rib 162 in the third direction.

2.2 Shutter 16

Figure 6:
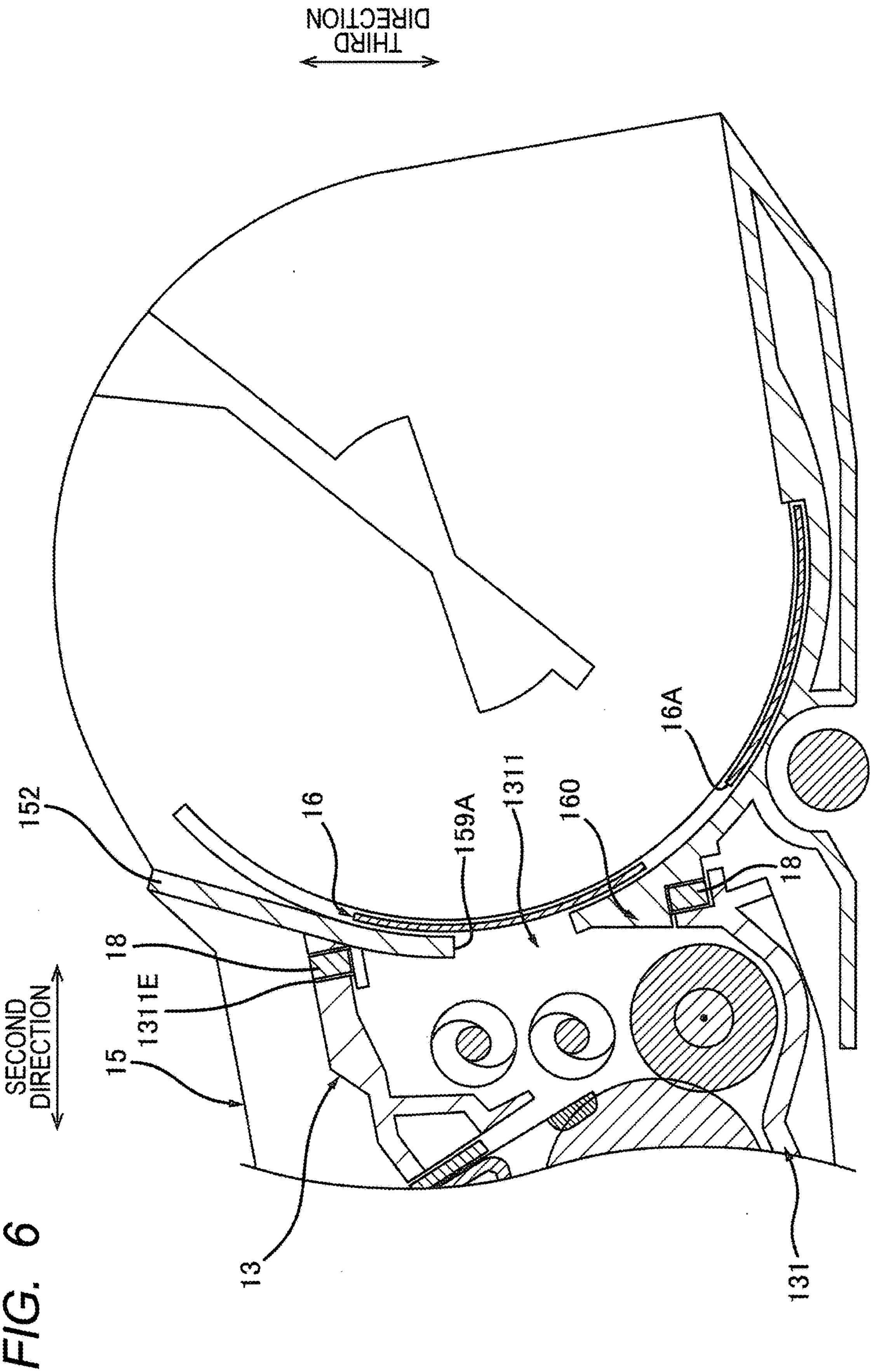
FIG. 6 is a partial cross-sectional view of the process cartridge shown in FIG. 1, showing a state where a shutter is located at a closed position.
Figure 7:
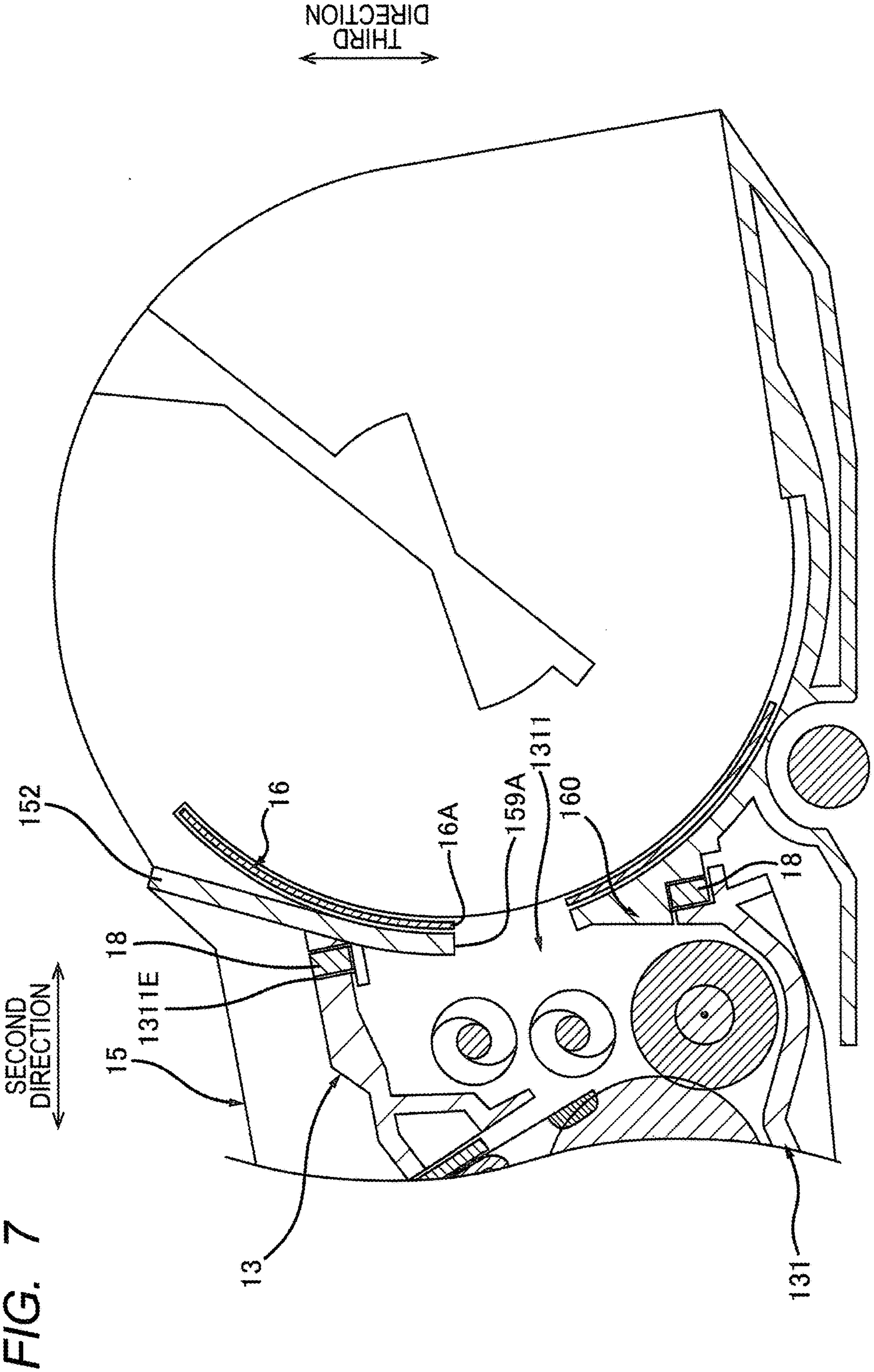
FIG. 7 is a partial cross-sectional view of the process cartridge shown in FIG. 1, showing a state where the shutter is located at an open position.

As shown in FIGS. 6 and 7, the shutter 16 is configured to open and close the passage opening 159A and the second passage openings 159B and 159C (see FIG. 5). Specifically, the shutter 16 is movable between a closed position (see FIG. 6) at which the passage opening 159A and the second passage openings 159B and 159C are closed and an open position (see FIG. 7) at which the passage opening 159A and the second passage openings 159B and 159C are open.

As shown in FIG. 2, the shutter 16 extends in the first direction. One end of the shutter 16 in the first direction fits into the guide portion 158A of the first frame 151A. The other end of the shutter 16 in the first direction fits into the guide portion 158B of the second frame 151B.

The shutter 16 is movable between the closed position (see FIG. 6) and the open position (see FIG. 7) while being guided by the guide portions 158A and 158B.

The shutter 16 has a shutter opening 16A, two second shutter openings 16B and 16C, and two engagement holes 16D and 16E.

2.2.1 Shutter Opening 16A

The shutter opening 16A is located at a central portion of the shutter 16 in the first direction.

As shown in FIG. 6, in a state where the shutter 16 is located at the closed position, the shutter opening 16A is located away from the passage opening 159A. In a state where the shutter 16 is located at the closed position, the shutter opening 16A does not communicate with the passage opening 159A. Thus, the shutter 16 closes the passage opening 159A.

As shown in FIG. 7, in a state where the shutter 16 is located at the open position, the shutter opening 16A communicates with the passage opening 159A. Thus, the passage opening 159A is opened.

2.2.2 Second Shutter Opening 16B

As shown in FIG. 2, the second shutter opening 16B is located away from the shutter opening 16A in the first direction. The second shutter opening 16B is located between the shutter opening 16A and the first frame 151A in the first direction.

In a state where the shutter 16 is located at the closed position (see FIG. 6), the second shutter opening 16B is located away from the second passage opening 159B (see FIG. 5). In a state where the second shutter opening 16B is located at the closed position, the second shutter opening 16B does not communicate with the second passage opening 159B. Thus, the shutter 16 closes the second passage opening 159B. In a state where the shutter 16 is located at the open position (see FIG. 7), the second shutter opening 16B communicates with the second passage opening 159B. Thus, the second passage opening 159B is opened.

2.2.3 Second Shutter Opening 16C

The second shutter opening 16C is located on the opposite side of the second shutter opening 16B with respect to the shutter opening 16A in the first direction. The second shutter opening 16C is located away from the shutter opening 16A in the first direction. The second shutter opening 16C is located between the shutter opening 16A and the second frame 151B in the first direction.

In a state where the shutter 16 is located at the closed position (see FIG. 6), the second shutter opening 16C is located away from the second passage opening 159C (see FIG. 5). In a state where the second shutter opening 16C is located at the closed position, the second shutter opening 16C does not communicate with the second passage opening 159C. Thus, the shutter 16 closes the second passage opening 159C. In a state where the shutter 16 is located at the open position (see FIG. 7), the second shutter opening 16C communicates with the second passage opening 159C. Thus, the second passage opening 159C is opened.

2.2.4 Engagement Holes 16D and 16E

The engagement hole 16D is located at one end of the shutter 16 in the first direction. The engagement hole 16D is located between the first frame 151A and the second shutter opening 16B in the first direction. The engagement hole 16D is located away from the second shutter opening 16B in the first direction.

The engagement hole 16E is located at the other end of the shutter 16 in the first direction. The engagement hole 16E is located between the second frame 151B and the second shutter opening 16C in the first direction. The engagement hole 16E is located away from the second shutter opening 16C in the first direction.

2.3 Details of Development Unit 13

As shown in FIG. 1, the development unit 13 includes two conveyors 134 and 135, two protrusions 136A and 137A (see FIG. 2), and two protrusions 136B and 137B (see FIG. 2), in addition to the development housing 131, the development roller 132, and the supply roller 133 described above. In other words, the process cartridge 1 includes the two conveyors 134 and 135, the two protrusions 136A and 137A (see FIG. 2), and the two protrusions 136B and 137B (see FIG. 2), in addition to the development housing 131, the development roller 132, and the supply roller 133.

2.3.1 Details of Development Housing 131

Figure 8:
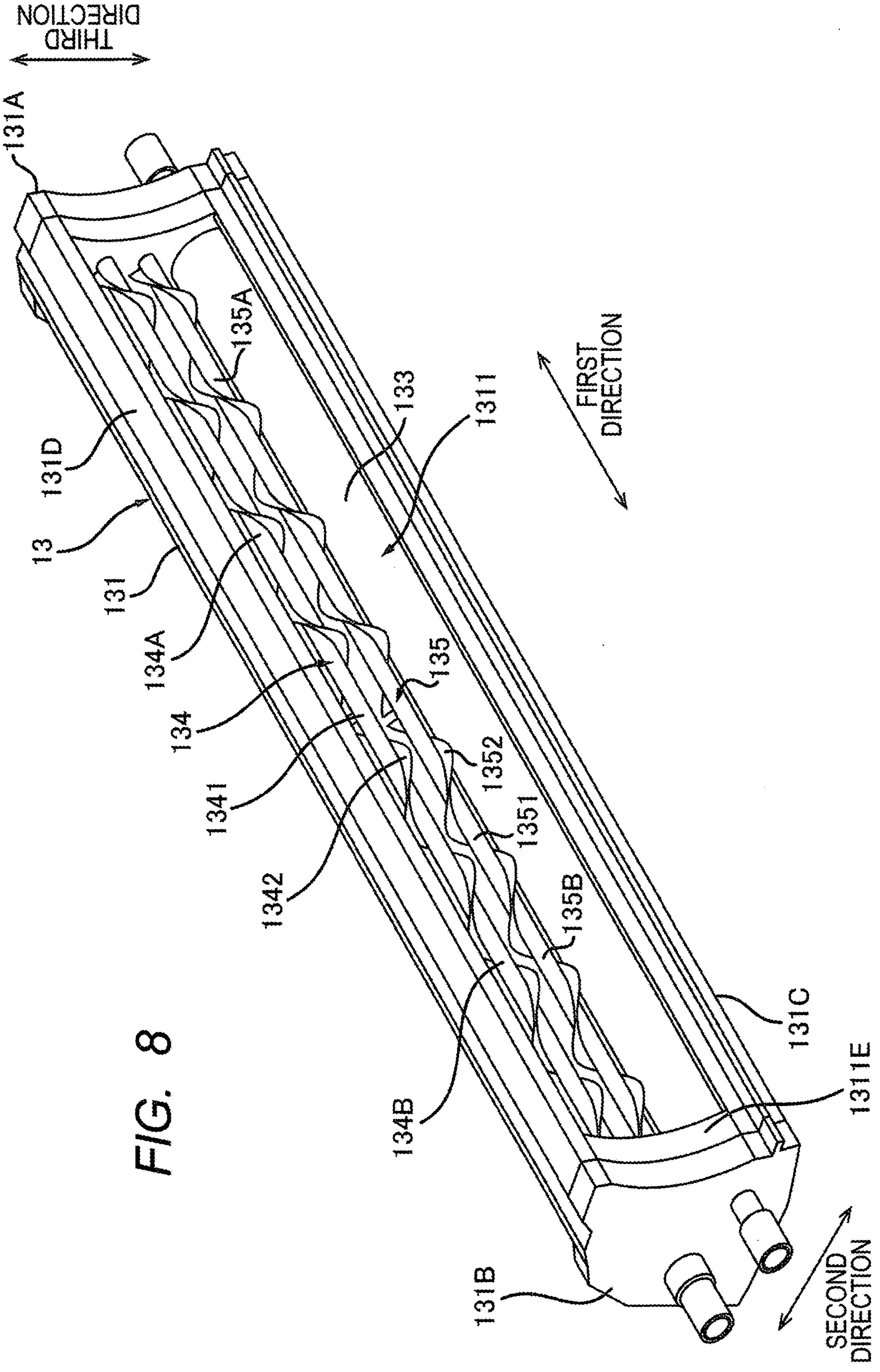
FIG. 8 is a perspective view of a development unit shown in FIG. 1.

The development housing 131 is located between the photosensitive drum 11 and the support frame 152 in the second direction. As shown in FIG. 2, the development housing 131 is located between the first frame 151A and the second frame 151B in the first direction. The development housing 131 extends in the first direction. As shown in FIG. 8, the development housing 131 includes a first wall 131A, a second wall 131B, a third wall 131C, and a fourth wall 131D. The development housing 131 has the reception opening 1311.

2.3.1.1 First Wall 131A to Fourth Wall 131D

The first wall 131A is located at one end of the development housing 131 in the first direction. The first wall 131A faces the first frame 151A (see FIG. 2) in the first direction. The first wall 131A extends in the second direction and the third direction. The first wall 131A supports one end of the development roller 132 (see FIG. 2) in the first direction. The first wall 131A supports one end of a shaft 1341 of the conveyor 134 in the first direction. The shaft 1341 will be described later. The first wall 131A supports one end of a shaft 1351 of the conveyor 135 in the first direction. The shaft 1351 will be described later.

The second wall 131B is located at the other end of the development housing 131 in the first direction. The second wall 131B is located away from the first wall 131A in the first direction. The second wall 131B is located between the first wall 131A and the second frame 151B (see FIG. 2) in the first direction. The second wall 131B faces the second frame 151B in the first direction. The second wall 131B extends in the second direction and the third direction. The second wall 131B supports the other end of the development roller 132 (see FIG. 2) in the first direction. The first wall 131A supports one end of the development roller 132 in the first direction, and the second wall 131B supports the other end of the development roller 132 in the first direction, whereby the development roller 132 is supported by the development housing 131. The second wall 131B supports the other end of the shaft 1341 of the conveyor 134 in the first direction. The first wall 131A supports one end of the shaft 1341 in the first direction, and the second wall 131B supports the other end of the shaft 1341 in the first direction, whereby the development housing 131 supports the conveyor 134. The second wall 131B supports the other end of the shaft 1351 of the conveyor 135 in the first direction. The first wall 131A supports one end of the shaft 1351 in the first direction, and the second wall 131B supports the other end of the shaft 1351 in the first direction, whereby the development housing 131 supports the conveyor 135.

The third wall 131C is located at one end of the development housing 131 in the third direction. The third wall 131C is located between the first wall 131A and the second wall 131B in the first direction. The third wall 131C extends in the first direction and the second direction. One end of the third wall 131C in the first direction is connected to the first wall 131A. In the present embodiment, one end of the third wall 131C in the first direction is connected to one end of the first wall 131A in the third direction. The other end of the third wall 131C in the first direction is connected to the second wall 131B. In the present embodiment, the other end of the third wall 131C in the first direction is connected to one end of the second wall 131B in the third direction.

The fourth wall 131D is located at the other end of the development housing 131 in the third direction. The fourth wall 131D is located away from the third wall 131C in the third direction. The fourth wall 131D is located between the first wall 131A and the second wall 131B in the first direction. The fourth wall 131D extends in the first direction and the second direction. One end of the fourth wall 131D in the first direction is connected to the first wall 131A. In the present embodiment, one end of the fourth wall 131D in the first direction is connected to the other end of the first wall 131A in the third direction. The other end of the fourth wall 131D in the first direction is connected to the second wall 131B. In the present embodiment, the other end of the fourth wall 131D in the first direction is connected to the other end of the second wall 131B in the third direction.

2.3.1.2 Reception Opening 1311

As shown in FIG. 1, the reception opening 1311 is located away from the development roller 132 in the second direction.

As shown in FIG. 8, an edge 1311E of the reception opening 1311 is formed by the other end of the first wall 131A in the second direction, the other end of the second wall 131B in the second direction, the other end of the third wall 131C in the second direction, and the other end of the fourth wall 131D in the second direction. That is, the reception opening 1311 is opened over an entirety between the first wall 131A and the second wall 131B in the first direction, and is opened over an entirety between the third wall 131C and the fourth wall 131D in the third direction.

The rib 160 (see FIG. 5) of the support frame 152 fits within the reception opening 1311. This suppresses the position of the reception opening 1311 being displaced relative to the support frame 152.

All of the passage opening 159A and the second passage openings 159B and 159C (see FIG. 5) are located within the reception opening 1311 in the first direction and the third direction. That is, the reception opening 1311 is larger than the passage opening 159A. The reception opening 1311 communicates with all of the passage opening 159A and the second passage openings 159B and 159C of the support frame 152. The reception opening 1311 receives the toner that has passed through the passage opening 159A of the support frame 152 in a state where the toner cartridge 2 (see FIG. 10) is supported by the support frame 152.

2.3.2 Conveyors 134 and 135

The conveyor 134 is located in the developer housing 131. The conveyor 134 is located away from the supply roller 133 in the third direction. The conveyor 134 conveys the toner in the development housing 131 in the first direction. The conveyor 134 is rotatable about an axis A4 (see FIG. 1). The axis A4 extends in the first direction. As shown in FIG. 8, the conveyor 134 includes the shaft 1341 and a blade 1342. In the present embodiment, the conveyor 134 is an auger screw.

The shaft 1341 extends in the first direction along the axis A4 (see FIG. 1). The blade 1342 is rotatable together with the shaft 1341. The blade 1342 extends in the first direction from the first wall 131A to the second wall 131B in the development housing 131. In this embodiment, the blade 1342 has a helical shape on the shaft 1341. The entirety of the blade 1342 is located in the reception opening 1311 in the first direction. The entirety of the blade 1342 faces the support frame 152 (see FIG. 1) via the reception opening 1311.

The conveyor 134 is configured to convey the toner in the development housing 131 from the passage opening 159A (see FIG. 5) toward the second passage openings 159B and 159C (see FIG. 5) in the first direction. Specifically, the conveyor 134 includes a first conveyance portion 134A and a second conveyance portion 134B.

The first conveyance portion 134A extends from a central portion of the conveyor 134 to the first wall 131A of the development housing 131 in the first direction. The first conveyance portion 134A is configured to convey the toner in the development housing 131 from the passage opening 159A (see FIG. 5) toward the second passage opening 159B (see FIG. 5) in the first direction.

The second conveyance portion 134B extends from the central portion of the conveyor 134 to the second wall 131B of the development housing 131 in the first direction. The second conveyance portion 134B is configured to convey the toner in the development housing 131 from the passage opening 159A (see FIG. 5) toward the second passage opening 159C (see FIG. 5) in the first direction.

The conveyor 135 is located in the development housing 131. The conveyor 135 is located between the conveyor 134 and the supply roller 133 in the third direction. The conveyor 135 conveys the toner in the development housing 131 in the first direction. The conveyor 135 is rotatable about an axis A5 (see FIG. 1). The axis A5 extends in the first direction. The conveyor 135 includes the shaft 1351 and a blade 1352. In the present embodiment, the conveyor 135 is an auger screw.

The shaft 1351 extends in the first direction along the axis A5 (see FIG. 1). The blade 1352 is rotatable together with the shaft 1351. The blade 1352 extends in the first direction from the first wall 131A to the second wall 131B in the development housing 131. In this embodiment, the blade 1352 has a helical shape on the shaft 1351. The entirety of the blade 1352 is located in the reception opening 1311 in the first direction. The entirety of the blade 1352 faces the support frame 152 (see FIG. 1) via the reception opening 1311.

The conveyor 135 is configured to convey the toner in the development housing 131 from the passage opening 159A (see FIG. 5) toward the second passage openings 159B and 159C (see FIG. 5) in the first direction. Specifically, the conveyor 135 includes a first conveyance portion 135A and a second conveyance portion 135B.

The first conveyance portion 135A extends from a central portion of the conveyor 135 to the first wall 131A of the development housing 131 in the first direction. The first conveyance portion 135A is configured to convey the toner in the development housing 131 from the passage opening 159A (see FIG. 5) toward the second passage opening 159B (see FIG. 5) in the first direction.

The second conveyance portion 135B extends from the central portion of the conveyor 135 to the second wall 131B of the development housing 131 in the first direction. The second conveyance portion 135B is configured to convey the toner in the development housing 131 from the passage opening 159A (see FIG. 5) toward the second passage opening 159C (see FIG. 5) in the first direction.

2.3.3 Protrusions 136A and 137A

As shown in FIG. 3, the protrusion 136A is located away from the photosensitive drum 11 in the direction connecting the drum axis A1 and the development axis A2. As shown in FIG. 2, the protrusion 136A is located at one end surface of the development housing 131 in the first direction. The protrusion 136A is one end of a shaft of the supply roller 133 (see FIG. 1). The protrusion 136A extends from the one end surface of the development housing 131 in the first direction. The protrusion 136A may be attached to the one end surface of the development housing 131 in the first direction. The protrusion 136A has a columnar shape. The protrusion 136A extends in the first direction. The protrusion 136A fits into the through hole 153A of the first frame 151A.

As shown in FIG. 3, the protrusion 137A is located between the photosensitive drum 11 and the protrusion 136A in the direction connecting the drum axis A1 and the development axis A2. As shown in FIG. 2, the protrusion 137A is one end of a shaft of the development roller 132. The protrusion 137A may extend from the one end surface of the development housing 131 in the first direction. The protrusion 137A may be attached to the one end surface of the development housing 131 in the first direction. The protrusion 137A has a columnar shape. The protrusion 137A extends in the first direction. The protrusion 137A fits into the through hole 154A of the first frame 151A.

2.3.4 Protrusions 136B and 137B

As shown in FIG. 4, the protrusion 136B is located away from the photosensitive drum 11 in the direction connecting the drum axis A1 and the development axis A2. As shown in FIG. 2, the protrusion 136B is located at the other end surface of the development housing 131 in the first direction. The protrusion 136B is the other end of the shaft of the supply roller 133 (see FIG. 1). The protrusion 136B extends from the other end surface of the development housing 131 in the first direction. The protrusion 136B may be attached to the other end surface of the development housing 131 in the first direction. The protrusion 136B has a columnar shape. The protrusion 136B extends in the first direction. The protrusion 136B fits into the through hole 153B of the second frame 151B.

As shown in FIG. 4, the protrusion 137B is located between the photosensitive drum 11 and the protrusion 136B in the direction connecting the drum axis A1 and the development axis A2. As shown in FIG. 2, the protrusion 137B is the other end of the shaft of the development roller 132. The protrusion 137B may extend from the other end surface of the development housing 131 in the first direction. The protrusion 137B may be attached to the other end surface of the development housing 131 in the first direction. The protrusion 137B has a columnar shape. The protrusion 137B extends in the first direction. The protrusion 137B fits into the through hole 154B of the second frame 151B.

The protrusion 136A fits into the through hole 153A, the protrusion 137A fits into the through hole 154A, the protrusion 136B fits into the through hole 153B, and the protrusion 137B fits into the through hole 154B, whereby the development unit 13 is movable relative to the photosensitive drum 11 in the direction connecting the drum axis A1 and the development axis A2. In other words, the development housing 131 is movable relative to the photosensitive drum 11 in the direction connecting the drum axis A1 and the development axis A2.

2.4 Seal 18

Figure 9:
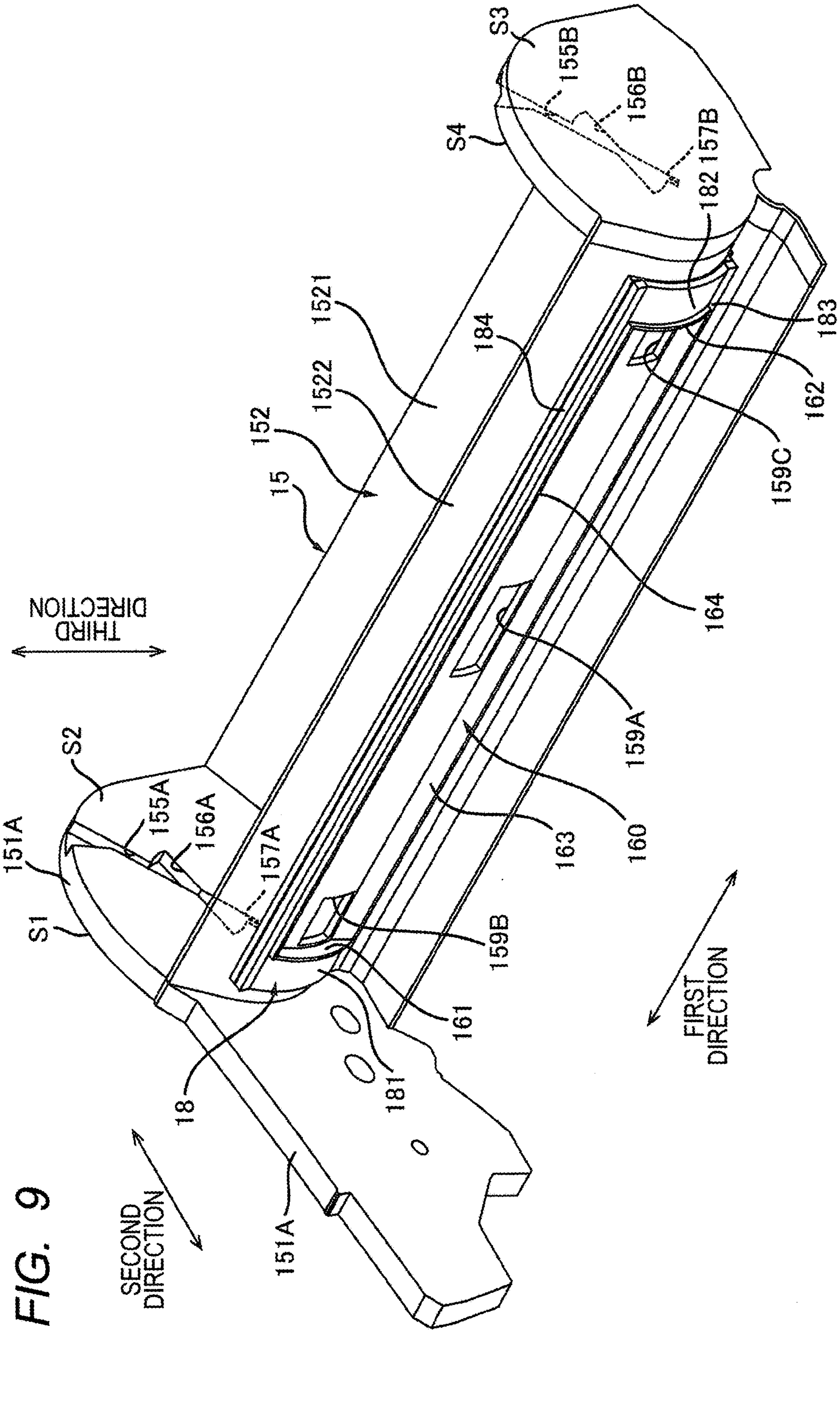
FIG. 9 is a perspective view of a part of the drum frame and the seal shown in FIG. 1, and shows a state where a support frame and the seal are in contact with each other.

As shown in FIG. 1, the seal 18 is located between the development unit 13 and the support frame 152 of the drum frame 15 in the second direction. As shown in FIG. 9, the seal 18 surrounds the rib 160 of the support frame 152. The seal 18 surrounds the passage opening 159A and the second passage openings 159B and 159C in the support frame 152. The seal 18 is located around the passage opening 159A and the second passage openings 159B and 159C, and is located away from the passage opening 159A. The rib 160 is located between the seal 18 and the passage opening 159A. The seal 18 has a frame shape. Specifically, the seal 18 includes a first seal portion 181, a second seal portion 182, a third seal portion 183, and a fourth seal portion 184.

The first seal portion 181 is located at one end of the seal 18 in the first direction. The first seal portion 181 is located on the opposite side of the passage opening 159A and the second passage opening 159B with respect to the first rib 161 of the rib 160 in the first direction. The first seal portion 181 extends in the third direction.

The second seal portion 182 is located at the other end of the seal 18 in the first direction. The second seal portion 182 is located on the opposite side of the passage opening 159A and the second passage opening 159C with respect to the second rib 162 of the rib 160 in the first direction. The second seal portion 182 extends in the third direction.

As shown in FIG. 5, the third seal portion 183 is located at one end of the seal 18 in the third direction. The third seal portion 183 is located on the opposite side of the passage opening 159A and the second passage openings 159B and 159C with respect to the third rib 163 of the rib 160 in the third direction. The third seal portion 183 is located between the first seal portion 181 and the second seal portion 182 in the first direction. The third seal portion 183 extends in the first direction. One end of the third seal portion 183 in the first direction is connected to one end of the first seal portion 181 in the third direction. The other end of the third seal portion 183 in the first direction is connected to one end of the second seal portion 182 in the third direction.

The fourth seal portion 184 is located at the other end of the seal 18 in the third direction. The fourth seal portion 184 is located away from the third seal portion 183 in the third direction. As shown in FIG. 9, the fourth seal portion 184 is located on the opposite side of the passage opening 159A and the second passage openings 159B and 159C with respect to the fourth rib 164 of the rib 160 in the third direction. The fourth seal portion 184 is located between the first seal portion 181 and the second seal portion 182 in the first direction. The fourth seal portion 184 extends in the first direction. One end of the fourth seal portion 184 in the first direction is connected to the other end of the first seal portion 181 in the third direction. The other end of the fourth seal portion 184 in the first direction is connected to the other end of the second seal portion 182 in the third direction.

The seal 18 is in contact with the partition portion 1522 of the support frame 152. The seal 18 is also in contact with the edge 1311E (see FIG. 8) of the reception opening 1311 of the development housing 131. Specifically, the first seal portion 181 of the seal 18 is in contact with the other end of the first wall 131A (see FIG. 8) of the development housing 131 in the second direction, the second seal portion 182 is in contact with the other end of the second wall 131B (see FIG. 8) in the second direction, the third seal portion 183 is in contact with the other end of the third wall 131C (see FIG. 8) in the second direction, and the fourth seal portion 184 is in contact with the other end of the fourth wall 131D (see FIG. 8) in the second direction. That is, as shown in FIG. 1, the seal 18 is in contact with the edge 1311E of the reception opening 1311 and the support frame 152. Thus, the seal 18 seals between the edge 1311E of the reception opening 1311 and the support frame 152.

The seal 18 is elastically deformable in accordance with the movement of the development housing 131 relative to the photosensitive drum 11. This suppresses the leakage of the toner from between the development housing 131 and the support frame 152 when the development housing 131 moves relative to the photosensitive drum 11. The seal 18 is made of, for example, sponge.

3. Toner Cartridge 2

The toner cartridge 2 will be described with reference to FIGS. 10 to 14. In the following description of the toner cartridge 2, the first direction, the second direction, and the third direction are the first direction, the second direction, and the third direction, respectively, in a state where the toner cartridge 2 is attached to the process cartridge 1, the process cartridge 1 is attached to the image forming apparatus 100, and the image forming apparatus 100 is placed on a horizontal plane.

Figure 10:
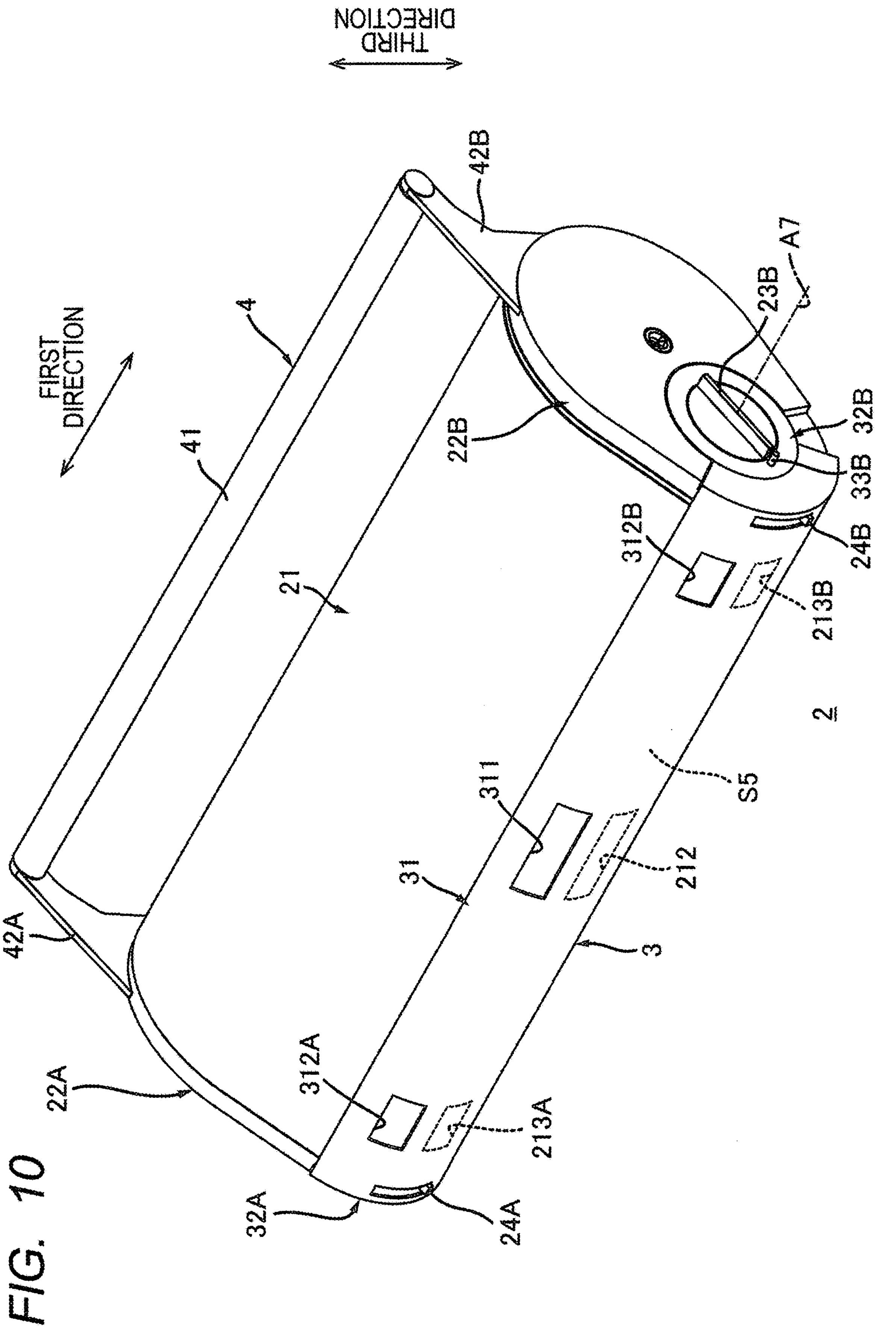
FIG. 10 is a perspective view of a toner cartridge.

As shown in FIG. 10, the toner cartridge 2 includes a housing 21, a toner shutter 3, and a handle 4.

3.1 Housing 21

The housing 21 is configured to contain toner. The housing 21 extends in the first direction. The housing 21 has a tubular shape. The housing 21 has the circumferential surface S5. The circumferential surface S5 extends in the first direction. The housing 21 includes a first side plate 22A, a second side plate 22B, a rib 23A (see FIG. 11), a rib 23B, and two engagement portions 24A and 24B. The housing 21 includes a discharge opening 212 and two return toner reception openings 213A and 213B.

3.1.1 First Side Plate 22A and Second Side Plate 22B

Figure 11:
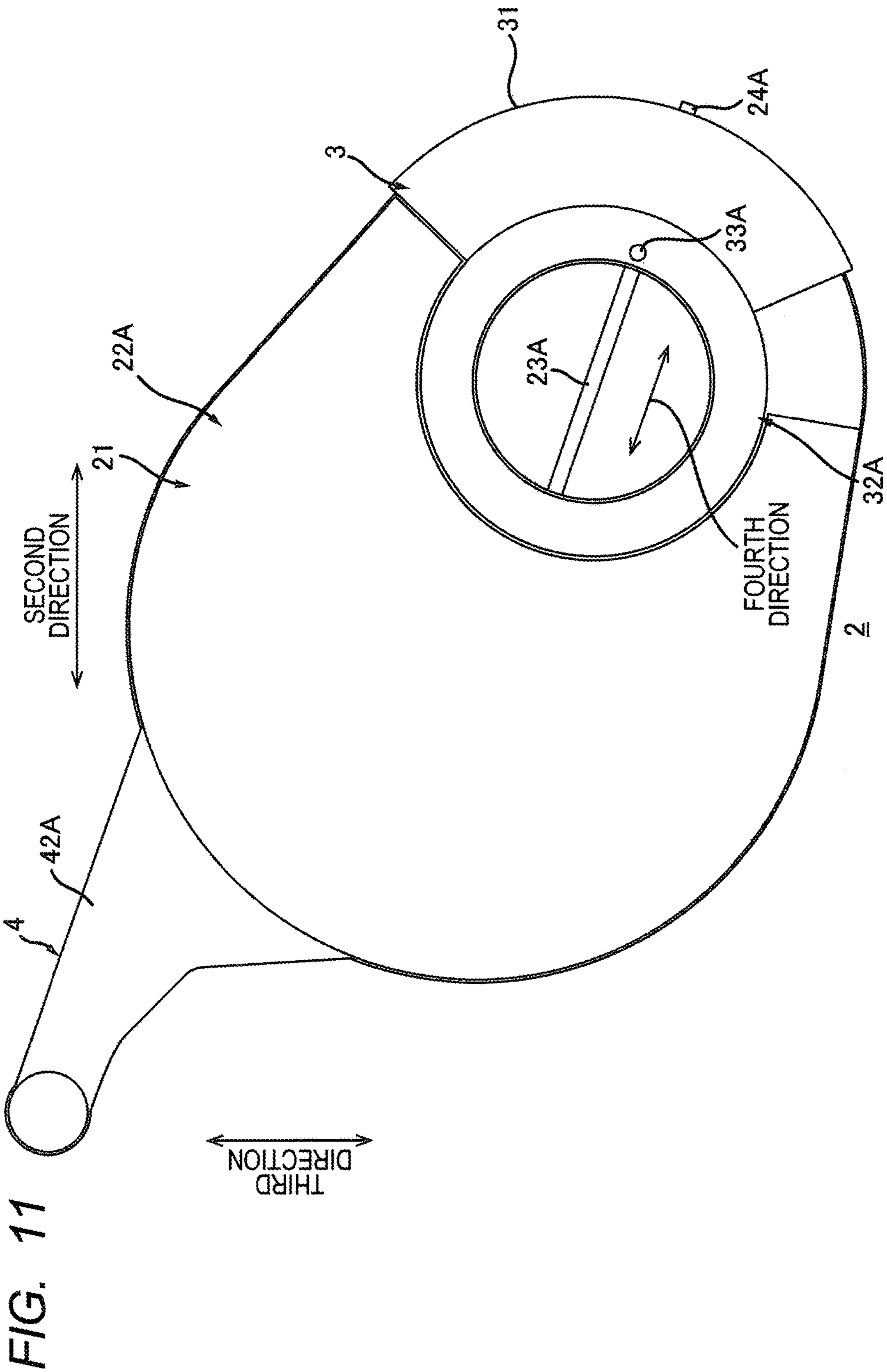
FIG. 11 is a side view of the toner cartridge shown in FIG. 10, as viewed from one side in the first direction.

The first side plate 22A is located at one end of the housing 21 in the first direction. The first side plate 22A extends in a direction crossing the first direction. For example, the first side plate 22A extends in a direction perpendicular to the first direction. As shown in FIG. 11, the first side plate 22A extends in the second direction and the third direction.

Figure 12:
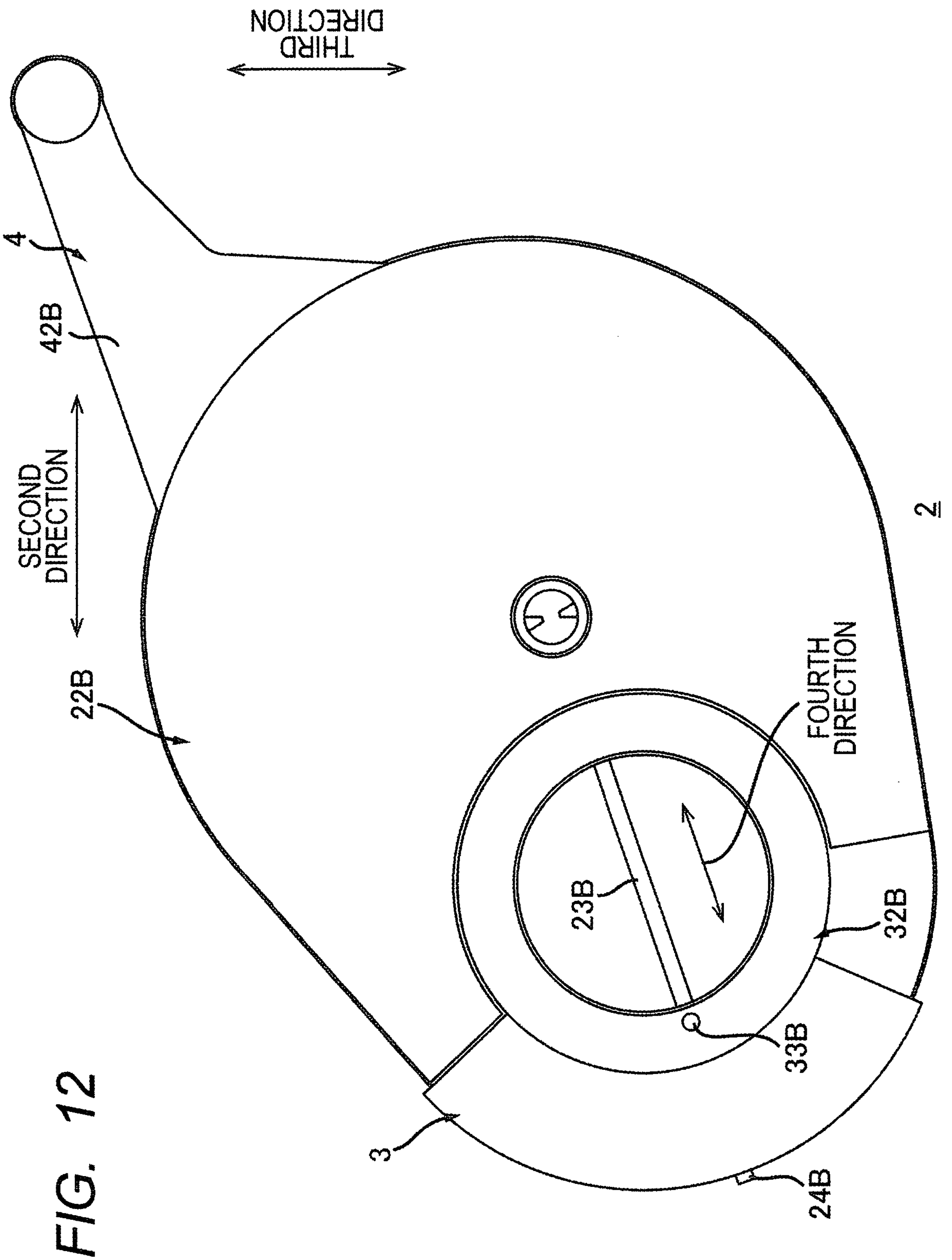
FIG. 12 is a side view of the toner cartridge shown in FIG. 10, as viewed from the other side in the first direction.

As shown in FIG. 10, the second side plate 22B is located at the other end of the housing 21 in the first direction. The second side plate 22B is located on the opposite side of the first side plate 22A with respect to the circumferential surface S5 in the first direction. The second side plate 22B is located away from the first side plate 22A in the first direction. The second side plate 22B extends in a direction crossing the first direction. For example, the second side plate 22B extends in a direction perpendicular to the first direction. As shown in FIG. 12, the second side plate 22B extends in the second direction and the third direction.

3.1.2 Discharge Opening 212

The discharge opening 212 is configured to discharge the toner in the housing 21. The discharge opening 212 is located at a central portion of the housing 21 in the first direction. The discharge opening 212 is located on the circumferential surface S5 of the housing 21. The discharge opening 212 is located at one end of the housing 21 in the second direction.

3.1.3 Return Toner Reception Openings 213A and 213B

The return toner reception opening 213A is configured to receive return toner that returns to the toner cartridge 2 from the development housing 131 (see FIG. 8) through the second passage opening 159B (see FIG. 9) of the process cartridge 1 in a state where the toner cartridge 2 is attached to the process cartridge 1. The returned toner reception opening 213A is located away from the discharge opening 212 in the first direction. The return toner reception opening 213A is located between the first side plate 22A and the discharge opening 212 in the first direction. The return toner reception opening 213A is located at one end of the housing 21 in the second direction. The return toner reception opening 213A is located on the circumferential surface S5 of the housing 21.

The return toner reception opening 213B is configured to receive return toner that returns to the toner cartridge 2 from the development housing 131 (see FIG. 8) through the second passage opening 159C (see FIG. 9) of the process cartridge 1 in a state where the toner cartridge 2 is attached to the process cartridge 1. The return toner reception opening 213B is located on the opposite side of the return toner reception opening 213A with respect to the discharge opening 212 in the first direction. The return toner reception opening 213B is located away from the discharge opening 212 in the first direction. The return toner reception opening 213B is located between the second side plate 22B and the discharge opening 212 in the first direction. The return toner reception opening 213B is located at one end of the housing 21 in the second direction. The return toner reception opening 213B is located on the circumferential surface S5 of the housing 21.

3.1.4 Ribs 23A and 23B

The rib 23A (see FIG. 11) is located on the opposite side of the second side plate 22B with respect to the first side plate 22A in the first direction. The rib 23A protrudes from the first side plate 22A in the first direction. As shown in FIG. 11, the rib 23A extends in a fourth direction. The fourth direction crosses the first direction, the second direction, and the third direction. For example, the fourth direction is perpendicular to the first direction, and crosses the second direction and the third direction. The rib 23A is located between the handle 4 and the discharge opening 212 (see FIG. 10) in the fourth direction.

As shown in FIG. 10, the rib 23B is located on the opposite side of the first side plate 22A with respect to the second side plate 22B in the first direction. The rib 23B protrudes from the second side plate 22B in the first direction. As shown in FIG. 12, the rib 23B extends in the fourth direction. The rib 23B is located between the handle 4 and the discharge opening 212 (see FIG. 10) in the fourth direction.

3.1.5 Engagement Portions 24A and 24B

As shown in FIG. 10, the engagement portion 24A is located at one end of the toner cartridge 2 in the first direction. The engagement portion 24A is located on the opposite side of the discharge opening 212 with respect to the return toner reception opening 213A in the first direction. As shown in FIG. 11, the engagement portion 24A is located at one end of the toner cartridge 2 in the second direction. The engagement portion 24A is a protrusion. The engagement portion 24A protrudes from one end of the first side plate 22A in the second direction. The engagement portion 24A extends in the fourth direction. The engagement portion 24A is arranged at an interval from the rib 23A in the fourth direction.

As shown in FIG. 10, the engagement portion 24B is located at the other end of the toner cartridge 2 in the first direction. The engagement portion 24B is located on the opposite side of the discharge opening 212 with respect to the return toner reception opening 213B in the first direction. The engagement portion 24B is located on the opposite side of the engagement portion 24A with respect to the discharge opening 212 in the first direction. As shown in FIG. 12, the engagement portion 24B is located at one end of the toner cartridge 2 in the second direction. The engagement portion 24B is a protrusion. The engagement portion 24B protrudes from one end of the second side plate 22B in the second direction. The engagement portion 24B extends in the fourth direction. The engagement portion 24B is arranged at an interval from the rib 23B in the fourth direction.

3.2 Toner Shutter 3

Figure 13:
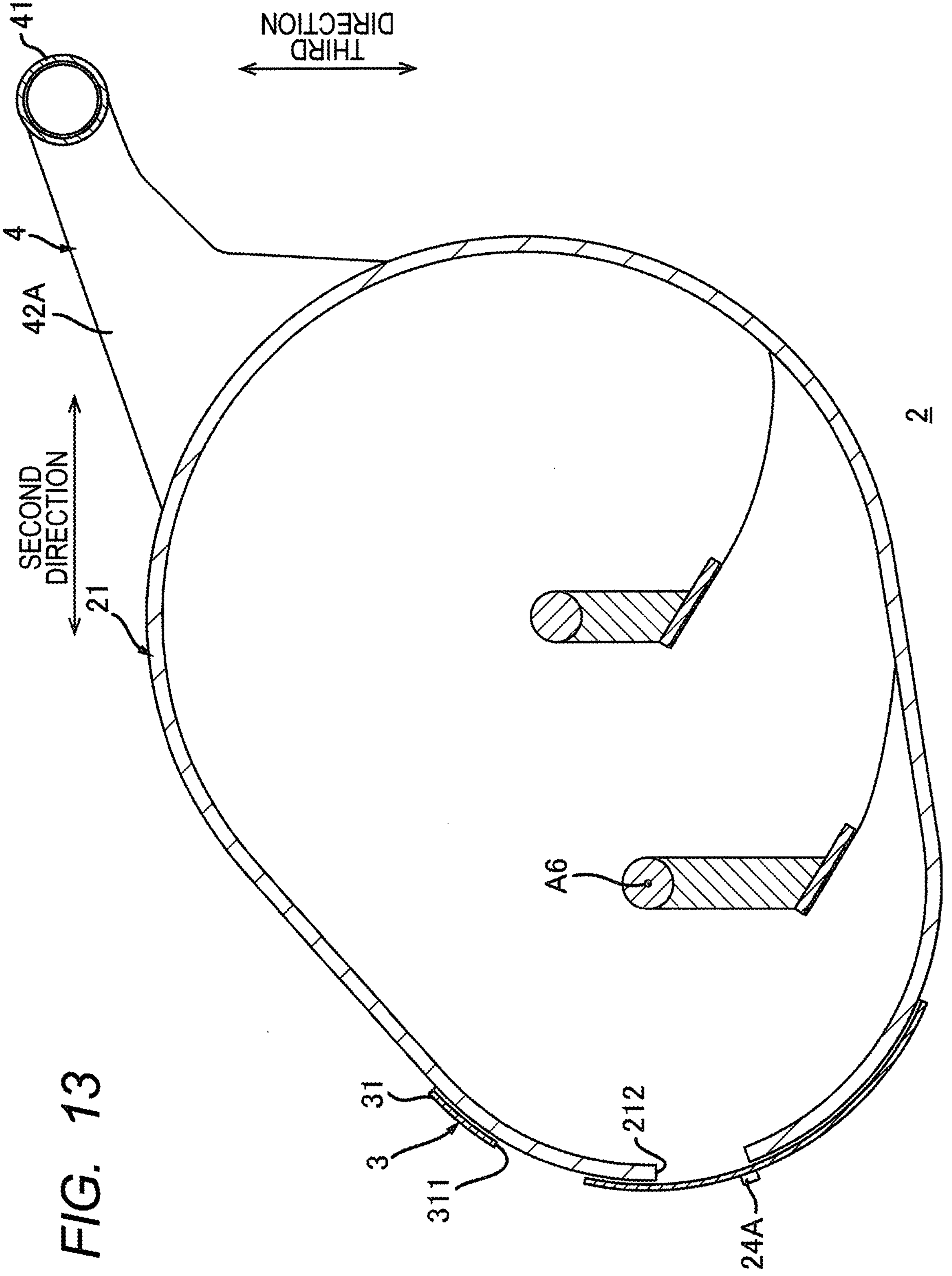
FIG. 13 is a central cross-sectional view of the toner cartridge shown in FIG. 10.
Figure 14:
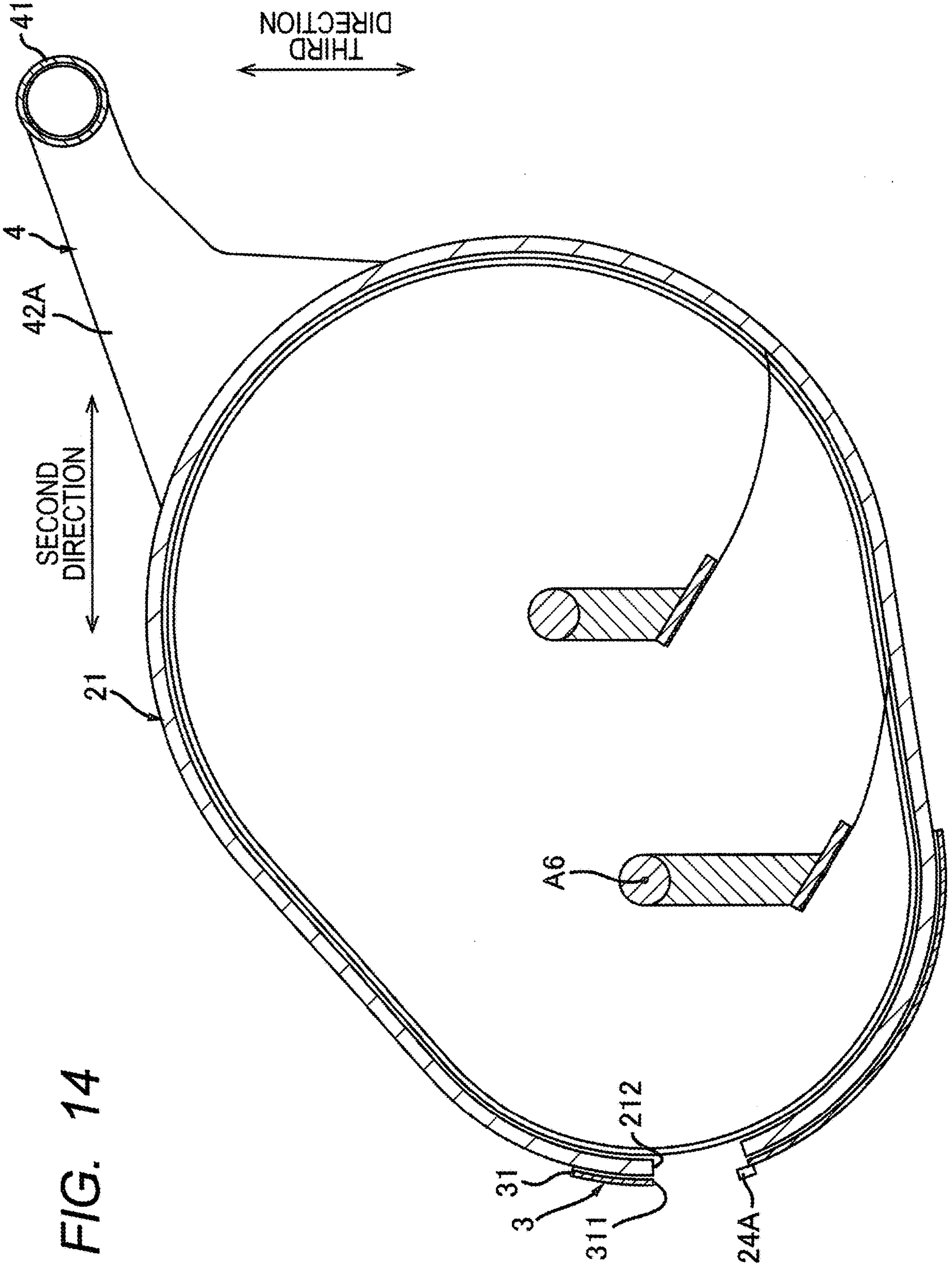
FIG. 14 shows a state where a toner shutter shown in FIG. 13 is located at an open position.

As shown in FIGS. 13 and 14, the toner shutter 3 is configured to open and close the discharge opening 212. The toner shutter 3 is movable between a closed position (see FIG. 13) and an open position (see FIG. 14). The toner shutter 3 is rotatable about an axis A6 between the closed position and the open position. The axis A6 extends in the first direction. The axis A6 is located between the discharge opening 212 and the handle 4 in the fourth direction. As shown in FIG. 13, the toner shutter 3 closes the discharge opening 212 in a state where the toner shutter 3 is located at the closed position. As shown in FIG. 14, the discharge opening 212 is opened in a state where the toner shutter 3 is located at the open position.

Specifically, as shown in FIG. 10, the toner shutter 3 extends in the first direction. The toner shutter 3 includes a shutter main body 31, a shutter side plate 32A (see FIG. 11), a shutter side plate 32B (see FIG. 12), the protrusion 33A (see FIG. 11), and the protrusion 33B (see FIG. 12).

3.2.1 Shutter Main Body 31

As shown in FIG. 10, the shutter main body 31 extends in the first direction. The shutter main body 31 is formed along the circumferential surface S5 of the housing 21. The shutter main body 31 has an arc shape. The shutter main body 31 has a shutter opening 311 and two shutter openings 312A and 312B.

The shutter opening 311 is located at a central portion of the shutter main body 31 in the first direction. As shown in FIG. 13, in a state where the toner shutter 3 is located at the closed position, the shutter opening 311 is located away from the discharge opening 212. Thus, the toner shutter 3 closes the discharge opening 212 in a state where the toner shutter 3 is located at the closed position. On the other hand, as shown in FIG. 14, in a state where the toner shutter 3 is located at the open position, at least part of the shutter opening 311 communicates with the discharge opening 212. Thus, the discharge opening 212 is opened in a state where the toner shutter 3 is located at the open position.

The shutter opening 312A is located between the shutter opening 311 and the shutter side plate 32A (see FIG. 11) in the first direction. The shutter opening 312A is located away from the shutter opening 311 in the first direction. In a state where the toner shutter 3 is located at the closed position (see FIG. 13), the shutter opening 312A is located away from the return toner reception opening 213A. Thus, the toner shutter 3 closes the return toner reception opening 213A in a state where the toner shutter 3 is located at the closed position. On the other hand, in a state where the toner shutter 3 is located at the open position (see FIG. 14), at least part of the shutter opening 312A communicates with the return toner reception opening 213A. Thus, the return toner reception opening 213A is opened in a state where the toner shutter 3 is located at the open position.

The shutter opening 312B is located between the shutter opening 311 and the shutter side plate 32B in the first direction. The shutter opening 312B is located away from the shutter opening 311 in the first direction. The shutter opening 312B is located on the opposite side of the shutter opening 312A with respect to the shutter opening 311 in the first direction. In a state where the toner shutter 3 is located at the closed position (see FIG. 13), the shutter opening 312B is located away from the return toner reception opening 213B. Thus, the toner shutter 3 closes the return toner reception opening 213B in a state where the toner shutter 3 is located at the closed position. On the other hand, in a state where the toner shutter 3 is located at the open position (see FIG. 14), at least part of the shutter opening 312B communicates with the return toner reception opening 213B. Thus, the return toner reception opening 213B is opened in a state where the toner shutter 3 is located at the open position.

3.2.2 Shutter Side Plates 32A and 32B

The shutter side plate 32A (see FIG. 11) is located at one end of the toner shutter 3 (see FIG. 10) in the first direction. As shown in FIG. 11, the shutter side plate 32A extends from one end of the shutter main body 31 in the first direction. The shutter side plate 32A extends in a direction crossing the first direction. For example, the shutter side plate 32A extends in a direction perpendicular to the first direction. The shutter side plate 32A is supported by the first side plate 22A.

As shown in FIG. 10, the shutter side plate 32B is located at the other end of the toner shutter 3 in the first direction. The shutter side plate 32B extends from the other end of the shutter main body 31 in the first direction. The shutter side plate 32B extends in a direction crossing the first direction. For example, the shutter side plate 32B extends in a direction perpendicular to the first direction. The shutter side plate 32B is supported by the second side plate 22B.

The shutter side plate 32A is supported by the first side plate 22A and the shutter side plate 32B is supported by the second side plate 22B, whereby the toner shutter 3 is supported by the housing 21.

3.2.3 Protrusions 33A and 33B

The protrusion 33A (see FIG. 11) is located on the opposite side of the shutter side plate 32B with respect to the shutter side plate 32A in the first direction. The protrusion 33A extends in the first direction. The protrusion 33A extends from the shutter side plate 32A. The protrusion 33A has a columnar shape. As shown in FIG. 11, in a state where the toner shutter 3 is located at the closed position, the protrusion 33A is aligned with the rib 23A in the fourth direction. In a state where the toner shutter 3 is located at the closed position, the protrusion 33A is located between the rib 23A and the engagement portion 24A in the fourth direction.

As shown in FIG. 10, the protrusion 33B is located on the opposite side of the shutter side plate 32A with respect to the shutter side plate 32B in the first direction. The protrusion 33B extends in the first direction. The protrusion 33B extends from the shutter side plate 32B. The protrusion 33B has a columnar shape. As shown in FIG. 12, in a state where the toner shutter 3 is located at the closed position, the protrusion 33B is aligned with the rib 23B in the fourth direction. In a state where the toner shutter 3 is located at the closed position, the protrusion 33B is located between the rib 23B and the engagement portion 24B in the fourth direction.

3.3 Handle 4

As shown in FIG. 10, the handle 4 is located at the other end of the toner cartridge 2 in the second direction. The handle 4 includes a grip 41 and two arms 42A and 42B.

The grip 41 is located between the arm 42A and the arm 42B in the first direction. The grip 41 is located away from the circumferential surface S5 of the housing 21. The grip 41 extends in the first direction. The grip 41 has a cylindrical shape.

The arm 42A extends from the first side plate 22A. The arm 42A may be attached to the first side plate 22A. The arm 42A supports one end of the grip 41 in the first direction.

The arm 42B extends from the second side plate 22B. The arm 42B supports the other end of the grip 41 in the first direction.

3.4 Operation of Attaching and Detaching Toner Cartridge 2 to and from Process Cartridge 1

Figure 15:
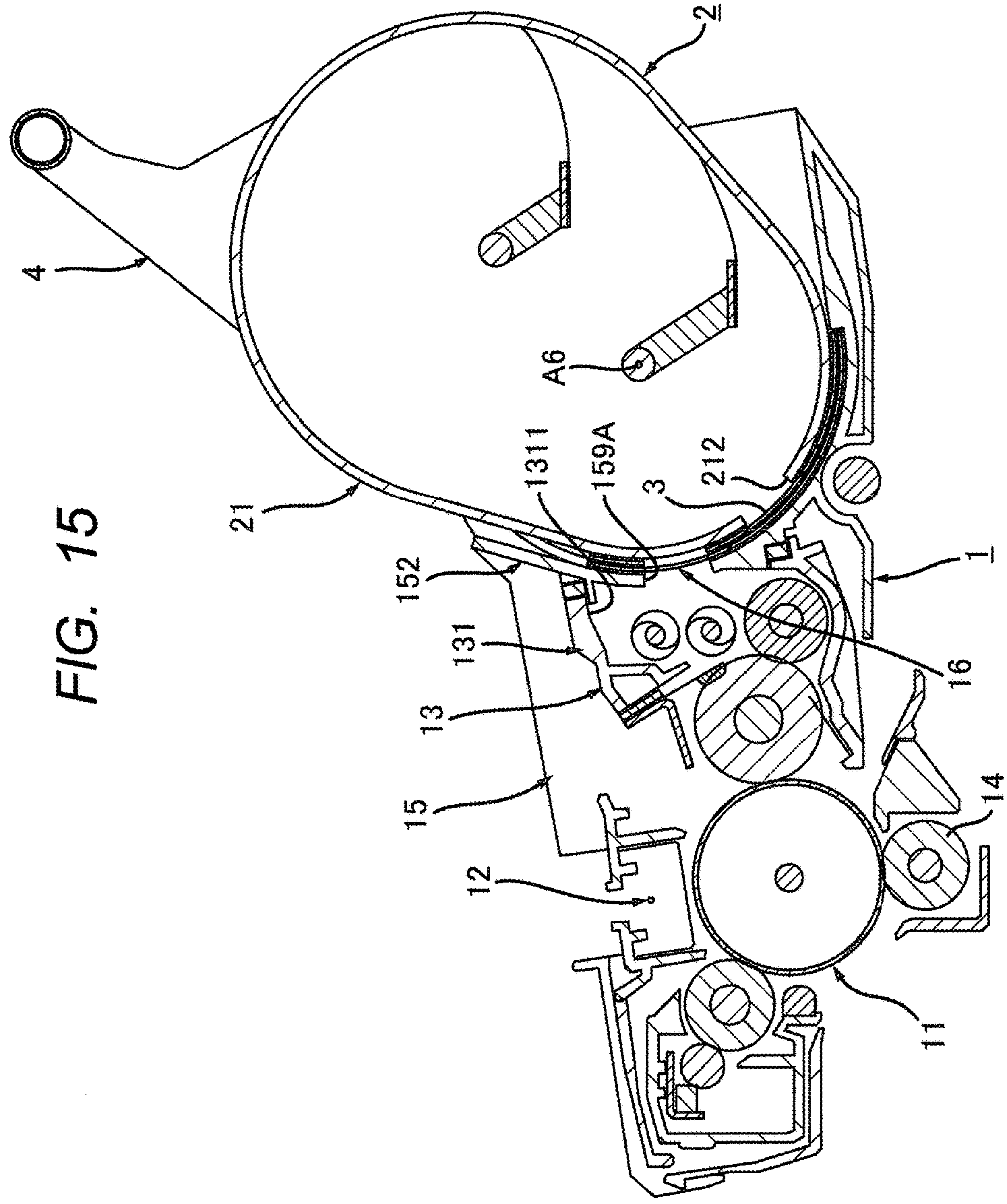
FIG. 15 is an explanatory view for explaining attaching of the toner cartridge to the process cartridge, and shows a state where the toner cartridge is inserted into the support frame, the toner shutter of the toner cartridge is located at the closed position, and the shutter of the process cartridge is located at the closed position.

In order to attach the toner cartridge 2 to the process cartridge 1, as shown in FIG. 15, the operator inserts the toner cartridge 2 into the support frame 152 of the process cartridge 1 in a state where the toner shutter 3 is located at the closed position.

Then, the rib 23A (see FIG. 11) of the toner cartridge 2 fits into the guide portion 155A (see FIG. 9) of the process cartridge 1. The rib 23B (see FIG. 10) of the toner cartridge 2 fits into the guide portion 155B (see FIG. 9) of the process cartridge 1.

Further, the protrusion 33A (see FIG. 11) of the toner cartridge 2 fits into the stopper 157A (see FIG. 9) of the process cartridge 1. The protrusion 33B (see FIG. 10) of the toner cartridge 2 fits into the stopper 157B (see FIG. 9) of the process cartridge 1. The protrusion 33A fits into the stopper 157A, and the protrusion 33B fits into the stopper 157B, whereby the toner shutter 3 is fixed to the process cartridge 1.

Further, the engagement portion 24A (see FIG. 10) of the toner cartridge 2 fits into the engagement hole 16D (see FIG. 2) of the shutter 16. The engagement portion 24B (see FIG. 10) of the toner cartridge 2 fits into the engagement hole 16E (see FIG. 2) of the shutter 16. The engagement portion 24A fits into the engagement hole 16D, and the engagement portion 24B fits into the engagement hole 16E, whereby the shutter 16 is movable together with the housing 21 of the toner cartridge 2.

Figure 16:
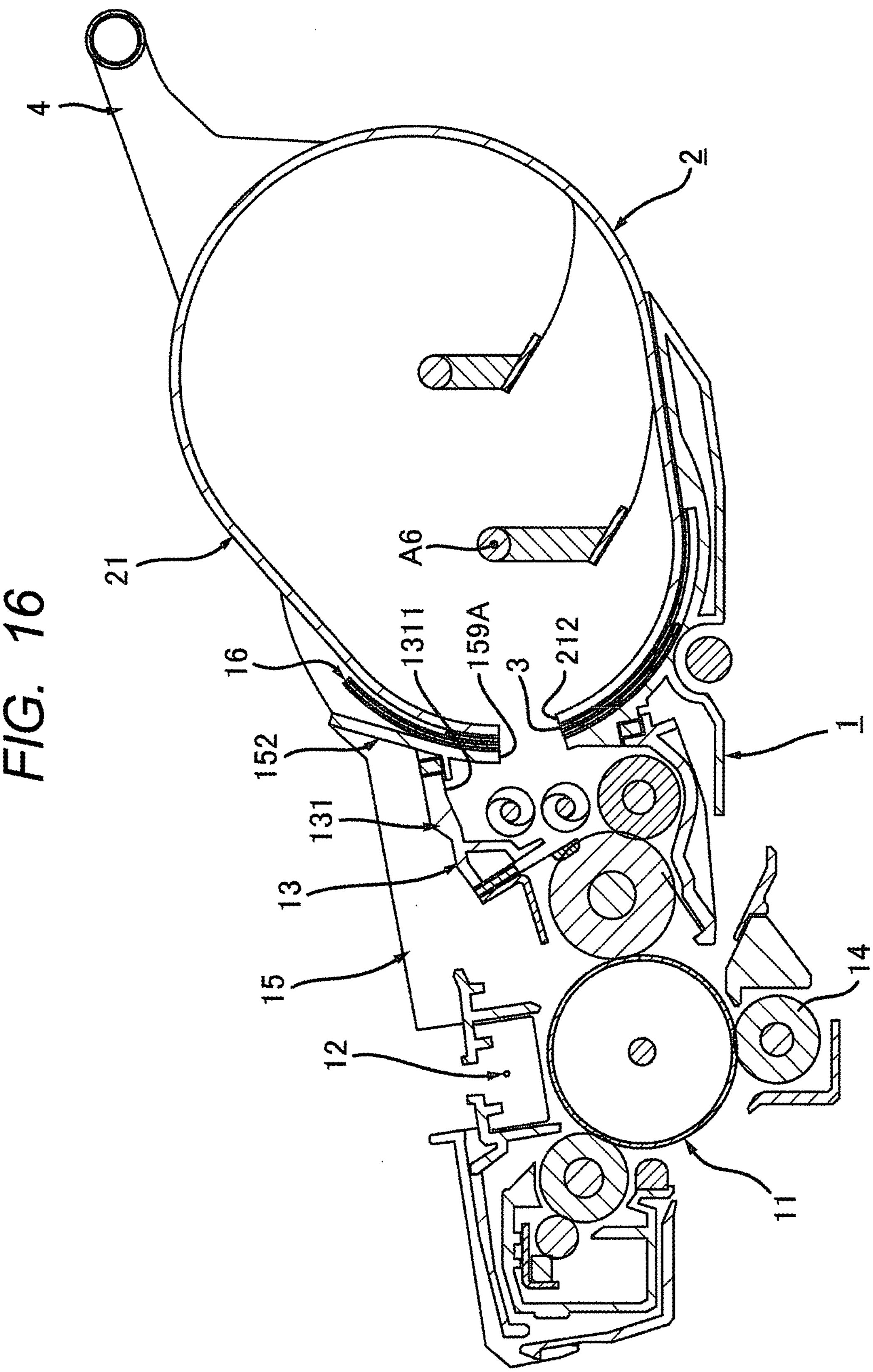
FIG. 16 is an explanatory view for explaining attaching of the toner cartridge to the process cartridge following FIG. 15, and shows a state where a housing of the toner cartridge is rotated, the toner shutter of the toner cartridge is located at the open position, and the shutter of the process cartridge is located at the open position.

Next, as shown in FIGS. 15 and 16, the operator rotates the housing 21 of the toner cartridge 2 about the axis A6.

Then, the housing 21 rotates in a state where the toner shutter 3 is fixed to the process cartridge 1, which causes the toner shutter 3 to move from the closed position to the open position relative to the housing 21. Further, the shutter 16 moves together with the housing 21, which causes the shutter 16 to move from the closed position to the open position relative to the support frame 152.

As shown in FIG. 16, when the toner cartridge 2 is completely attached to the process cartridge 1, the toner shutter 3 is located at the open position, and the shutter 16 is located at the open position.

Further, the rib 23A (see FIG. 11) of the toner cartridge 2 fits into the lock portion 156A (see FIG. 9) of the process cartridge 1. The rib 23B (see FIG. 10) of the toner cartridge 2 fits into the lock portion 156B (see FIG. 9) of the process cartridge 1. The rib 23A fits into the lock portion 156A, and the rib 23B fits into the lock portion 156B, whereby the toner cartridge 2 is locked relative to the process cartridge 1.

In order to detach the toner cartridge 2 from the process cartridge 1, as shown in FIGS. 16 and 15, the operator first rotates the housing 21 of the toner cartridge 2 in the direction opposite to the direction in which the housing 21 is rotated when the toner cartridge 2 is attached to the process cartridge 1.

Then, the housing 21 is rotated in a state where the toner shutter 3 is fixed to the process cartridge 1, which causes the toner shutter 3 to move from the open position to the closed position relative to the housing 21. Further, the shutter 16 moves together with the housing 21, which causes the shutter 16 to move from the open position to the closed position relative to the support frame 152.

As shown in FIG. 15, in a state where the toner shutter 3 is located at the closed position and the shutter 16 is located at the closed position, the rib 23A (see FIG. 11) is disengaged from the lock portion 156A (see FIG. 9), and the rib 23B (see FIG. 10) is disengaged from the lock portion 156B (see FIG. 9). Thereby, lock of the toner cartridge 2 relative to the process cartridge 1 is released.

Thereafter, the operator detaches the toner cartridge 2 from the support frame 152 of the process cartridge 1.

4. Image Forming Apparatus

Next, the image forming apparatus 100 will be described with reference to FIGS. 17 and 18.

The image forming apparatus 100 includes a main housing 101, a cover 102, a sheet storage portion 103, the process cartridge 1, the toner cartridge 2, an exposure device 104, and a fuser (fixing device) 105.

4.1 Main Housing 101

The main housing 101 accommodates the sheet storage portion 103, the process cartridge 1, the toner cartridge 2, the exposure device 104, and the fuser 105. The main housing 101 has an opening 101A (see FIG. 18).

4.2 Cover 102

Figure 17:
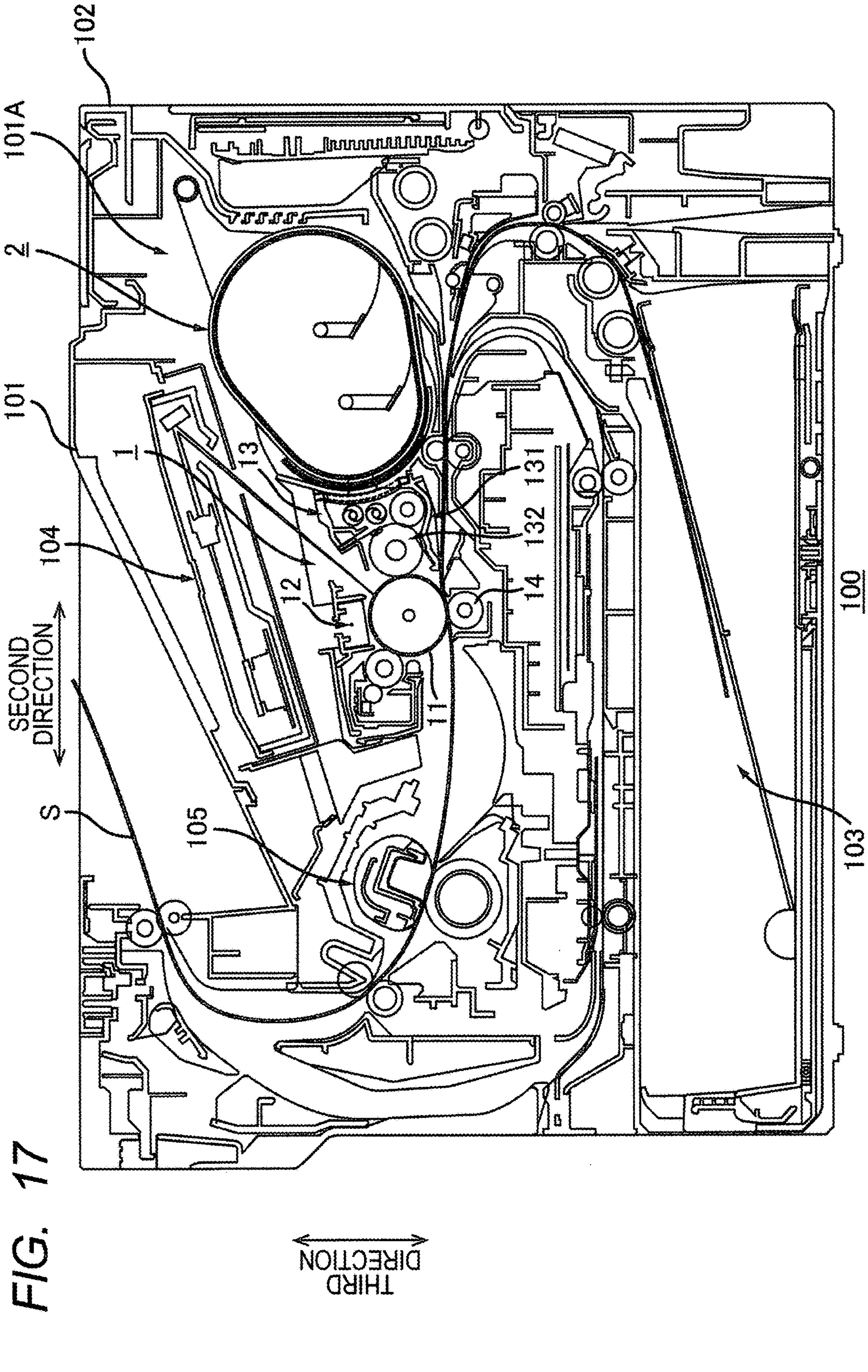
FIG. 17 is a schematic configuration diagram of an image forming apparatus.
Figure 18:
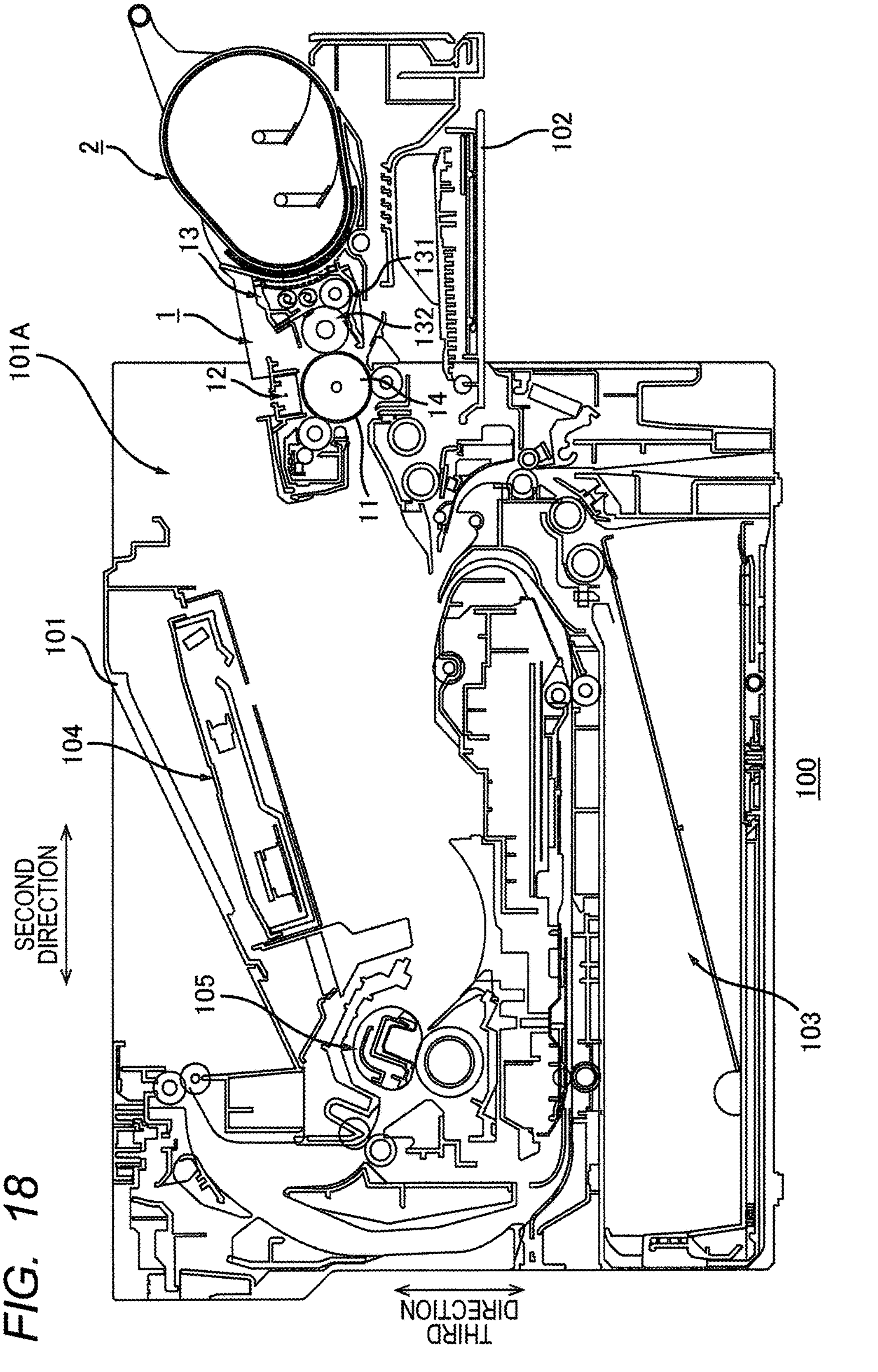
FIG. 18 shows a state where the process cartridge shown in FIG. 17 is detached from the image forming apparatus.

The cover 102 is movable between a cover closed position (see FIG. 17) and a cover open position (see FIG. 18). As shown in FIG. 17, in a state where the cover 102 is located at the cover closed position, the cover 102 closes the opening 101A. As shown in FIG. 18, in a state where the cover 102 is located at the cover open position, the opening 101A is opened. In a state where the cover 102 is located at the cover open position, the process cartridge 1 is attachable to and detachable from the image forming apparatus 100 through the opening 101A.

4.3 Sheet Storage Portion 103

As shown in FIG. 17, the sheet storage portion 103 is configured to store the sheet S. The sheet S in the sheet storage portion 103 is conveyed toward the transfer roller 14. The sheet S from the sheet storage portion 103 passes between the transfer roller 14 and the photosensitive drum 11. At this time, the toner on the photosensitive drum 11 is transferred onto the sheet S by the transfer roller 14.

4.4 Exposure Device 104

The exposure device 104 is configured to expose the photosensitive drum 11. Specifically, in a state where the process cartridge 1 is attached to the image forming apparatus 100, the exposure device 104 exposes the surface of the photosensitive drum 11 charged by the charger 12. The development roller 132 supplies toner to the exposed surface of the photosensitive drum 11. In the present embodiment, the exposure device 104 is a laser scan unit. The exposure device 104 may be an LED head.

4.5 Fuser 105

The fuser 105 is located away from the cover 102 in the second direction. The fuser 105 fixes the toner transferred onto the sheet S to the sheet S. In the present embodiment, the fuser 105 fixes the toner to the sheet S by heating and pressurizing the sheet S to which the toner has been transferred. The sheet S that has passed through the fuser 105 is discharged onto an upper surface of the main housing 101.

5. Operations and Effects (1) In the process cartridge 1, as shown in FIG. 7, the reception opening 1311 is larger than the passage opening 159A. The seal 18 for sealing between the edge 1311E of the reception opening 1311 and the support frame 152 is located around the passage opening 159A of the support frame 152, and is located away from the passage opening 159A.

This reduces the contact of the toner supplied from the toner cartridge 2 into the development housing 131 through the passage opening 159A with the seal 18, in a state where the toner cartridge 2 (see FIG. 10) is supported by the support frame 152.

This suppresses the seal 18 hindering the flow of toner from the toner cartridge 2 (see FIG. 10) toward the development housing 131.

As a result, the toner is stably supplied from the toner cartridge 2 to the development housing 131 while suppressing the toner leakage from between the edge 1311E of the reception opening 1311 and the support frame 152.

(2) According to the process cartridge 1, as shown in FIG. 8, the edge 1311E of the reception opening 1311 is formed by the other end of the first wall 131A in the second direction, the other end of the second wall 131B in the second direction, the other end of the third wall 131C in the second direction, and the other end of the fourth wall 131D in the second direction.

According to such a configuration, the toner having passed through the passage opening 159A is received by the reception opening 1311 having a size extending from one end to the other end of the development housing 131 in the first direction and extending from one end to the other end of the development housing 131 in the third direction.

(3) According to the process cartridge 1, the conveyor 134 conveys the toner in the development housing 131 in the first direction. The blade 1342 of the conveyor 134 extends in the first direction from the first wall 131A to the second wall 131B in the development housing 131. The entirety of the blade 1342 is located in the reception opening 1311 in the first direction.

According to such a configuration, the toner having passed through the passage opening 159A (see FIG. 7) is received by the reception opening 1311 having a size extending over the entirety of the blade 1342 of the conveyor 134 in the first direction.

(4) According to the process cartridge 1, the entirety of the blade 1342 faces the support frame 152 (see FIG. 1) via the reception opening 1311.

According to such a configuration, there is no wall of the development housing 131 between the blade 1342 and the support frame 152 (see FIG. 1). This reduces the contact of toner supplied from the toner cartridge 2 (see FIG. 10) into the development housing 131 through the passage opening 159A (see FIG. 7) with a wall of the development housing 131 before the toner enters the development housing 131.

(5) According to the process cartridge 1, as shown in FIG. 5, the support frame 152 has the second passage opening 159B. In a state where the toner cartridge 2 (see FIG. 10) is supported by the support frame 152, the toner from the development housing 131 passes through the second passage opening 159B. The passage opening 159A and the second passage opening 159B are located within the reception opening 1311 (see FIG. 8) in the first direction.

According to such a configuration, the toner in the development housing 131 (see FIG. 8) is returned to the toner cartridge 2 (see FIG. 10) through the second passage opening 159B (see FIG. 5). Thus, the toner is circulated between the development housing 131 (see FIG. 8) and the toner cartridge 2 (see FIG. 10). This resultantly suppresses the stagnation of the toner in the development housing 131 (see FIG. 8).

(6) According to the process cartridge 1, as shown in FIG. 5, the support frame 152 includes the rib 160. The rib 160 is located around the passage opening 159A of the support frame 152, and is located away from the passage opening 159A. As shown in FIG. 6, the rib 160 fits into the reception opening 1311 of the development housing 131.

According to such a configuration, the positional deviation of the reception opening 1311 of the development housing 131 relative to the support frame 152 is suppressed.

(7) According to the process cartridge 1, as shown in FIG. 9, the rib 160 is located between the seal 18 and the passage opening 159A.

According to such a configuration, the rib 160 suppresses contact of the toner supplied from the toner cartridge 2 (see FIG. 10) into the development housing 131 (see FIG. 8) through the passage opening 159A with the seal 18.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided as appropriate.

What is claimed is:

1. An image forming apparatus to which a toner cartridge is detachably attachable, the image forming apparatus comprising:
- a photosensitive drum rotatable about a drum axis extending in a first direction;
- a drum frame including:
  - a first frame supporting one end of the photosensitive drum in the first direction;
  - a second frame supporting another end of the photosensitive drum in the first direction; and
  - a partition portion not movable relative to the photosensitive drum, the partition portion having a passage opening through which toner from the toner cartridge passes;
- a development roller;
- a development housing having a reception opening configured to receive toner that has passed through the passage opening, the reception opening being larger than the passage opening, the development housing supporting the development roller, the development housing being movable relative to the photosensitive drum;
- a seal located around the passage opening and the reception opening, the seal sealing between the partition portion and the development housing; and
- a conveyor located in the development housing, the conveyor being configured to convey toner,
- the conveyor facing the partition portion via the reception opening.

2. The image forming apparatus according to claim 1, wherein the development roller is supported at one end of the development housing in a second direction crossing the first direction;
- wherein the development housing includes:
  - a first wall located at one end of the development housing in the first direction, the first wall extending in the second direction and a third direction, the third direction crossing both the first direction and the second direction;
  - a second wall located at another end of the development housing in the first direction, the second wall extending in the second direction and the third direction;
  - a third wall located at one end of the development housing in the third direction, the third wall extending in the first direction and the second direction; and
  - a fourth wall located at another end of the development housing in the third direction, the fourth wall extending in the first direction and the second direction; and
- wherein an edge of the reception opening is formed by another end of the first wall in the second direction, another end of the second wall in the second direction, another end of the third wall in the second direction, and another end of the fourth wall in the second direction.

3. The image forming apparatus according to claim 2, wherein the conveyor is configured to convey toner in the first direction within the development housing, the conveyor including a shaft extending in the first direction and a blade rotatable together with the shaft;
- wherein the blade extends within the development housing from the first wall to the second wall in the first direction; and
- wherein an entirety of the blade is located within the reception opening in the first direction.

4. The image forming apparatus according to claim 3, wherein the entirety of the blade faces the partition portion via the reception opening.

5. The image forming apparatus according to claim 3, wherein the first wall supports one end of the shaft in the first direction; and
- wherein the second wall supports another end of the shaft in the first direction.

6. The image forming apparatus according to claim 1, wherein the partition portion further has a second passage opening located away from the passage opening in the first direction; and
- wherein the passage opening and the second passage opening are located within the reception opening in the first direction.

7. The image forming apparatus according to claim 6, wherein the conveyor is configured to convey toner in the first direction within the development housing; and
- wherein the conveyor is configured to convey toner from the passage opening toward the second passage opening.

8. The image forming apparatus according to claim 1, further comprising:
- a shutter configured to open and close the passage opening.

9. The image forming apparatus according to claim 1, wherein the partition portion includes a rib located around the passage opening and away from the passage opening; and
- wherein the rib fits in the reception opening.

10. The image forming apparatus according to claim 9, wherein the rib is located between the seal and the passage opening.

11. The image forming apparatus according to claim 1, wherein the conveyor directly faces the partition portion via the reception opening.

* * * * *